United States Patent
Ericksen et al.

(10) Patent No.: US 7,004,677 B1
(45) Date of Patent: Feb. 28, 2006

(54) ENHANCED IRRIGATION VALVE PLATFORM ASSEMBLY

(75) Inventors: Kent C. Ericksen, North Salt Lake, UT (US); Kevin Day, Layton, UT (US); Christian M. Olsen, Bountiful, UT (US); Aaron Schapper, Park City, UT (US); Alan T. Ence, Syracuse, UT (US)

(73) Assignee: Orbit Irrigation Products, Inc., Bountiful, UT (US)

( * ) Notice: Subject to any disclaimer, the term of this patent is extended or adjusted under 35 U.S.C. 154(b) by 119 days.

(21) Appl. No.: 10/755,693

(22) Filed: Jan. 12, 2004

Related U.S. Application Data

(60) Provisional application No. 60/439,671, filed on Jan. 13, 2003.

(51) Int. Cl.
*E02B 11/00* (2006.01)
(52) U.S. Cl. .......................... 405/51; 405/43; 405/40; 405/37; 137/364; 137/371; 137/372
(58) Field of Classification Search .................. 405/36, 405/39, 40, 41, 57; 137/364, 372, 363, 371, 137/377, 382
See application file for complete search history.

(56) References Cited

U.S. PATENT DOCUMENTS

| 3,490,637 | A | | 1/1970 | Pope |
| 3,770,873 | A | | 11/1973 | Brown |
| 4,065,020 | A | * | 12/1977 | Carson ...................... 220/484 |
| 4,163,503 | A | * | 8/1979 | McKinnon .................. 137/371 |
| 4,310,015 | A | | 1/1982 | Stewart et al. |
| 4,872,575 | A | | 10/1989 | Kobilan |
| 4,976,366 | A | | 12/1990 | Russell |
| 5,037,238 | A | | 8/1991 | Wait |
| 5,394,898 | A | | 3/1995 | Turner |
| 6,035,887 | A | | 3/2000 | Cato |
| 6,460,563 | B1 | | 10/2002 | Olson et al. |
| 6,772,566 | B1 | * | 8/2004 | Machledt et al. .......... 52/169.6 |
| 6,834,662 | B1 | * | 12/2004 | Olson et al. ............. 137/364 |
| 2004/0231724 | A1 | * | 11/2004 | Mahaney .................... 137/371 |

* cited by examiner

*Primary Examiner*—Frederick L. Lagman
(74) *Attorney, Agent, or Firm*—Madson & Metcalf

(57) ABSTRACT

A valve containment assembly for an irrigation system may have a first side wall unit, a grate, a second side wall unit, and a lid. The first side wall unit may be disposed on the floor of a hole. The grate may be positioned in the first side wall unit to support a manifold. The second side wall unit rests on the first side wall unit to cover the manifold and the lid may be disposed on top of the side wall unit. The first side wall unit and the grate elevate the manifold above the floor of the hole to reduce interference of soil and water with the manifold. Additional side wall units may be used to provide additional height. Any of the side wall units may have frangible portions that break away to permit passage of conduits into the valve containment assembly.

61 Claims, 9 Drawing Sheets

ENHANCED IRRIGATION VALVE PLATFORM ASSEMBLY

RELATED APPLICATIONS

The present application claims the benefit of U.S. Provisional Application No. 60/439,671, filed Jan. 13, 2003 and entitled ENHANCED IRRIGATION VALVE CONTAINMENT ASSEMBLY, which is incorporated herein by reference.

BACKGROUND OF THE INVENTION

1. Field of the Invention

The present invention relates to irrigation systems and methods. More specifically, the present invention relates to an apparatus and method for containing one or more underground irrigation valves.

2. Description of Related Art

Irrigation not only permits foodstuffs to be grown, but also enables the cultivation of attractive plant life that otherwise would not have sufficient water to thrive. Many households now utilize irrigation systems, or "sprinkler systems," to provide irrigation in a comparatively uniform and trouble-free manner.

Often, a control unit such as a timer is used to regularly initiate operation of the sprinkler system to automatically provide the desired distribution of irrigation water. The timer is electrically connected to a plurality of electrically operated valves, each of which is able to permit water to flow into a corresponding zone of the sprinkler system. The valves must be individually activated so that the entire pressure and flow rate available will be focused on each zone, in turn.

The valves may be stored underground to protect them from interference. In many residential systems, irrigation valves are disposed within an underground valve box with side walls and a lid disposed at ground level. A main line runs into the valve box, and water distribution conduits run out of the box to reach individual water distribution units.

Unfortunately, known valve box designs often do not sufficiently protect the valves. The hole in which the valve box is located may fill with water due to leakage from the irrigation system components or from precipitation. Since the valves are often disposed near the bottom of the hole, the water may easily rise to the level of the valves. The valves typically have solenoids, wires, and/or other electrical components that may be damaged by water entry. Hence, many known valve box designs permit valve components to be relatively easily damaged due to water infiltration.

Furthermore, water leakage or simple settling over time may cause the earth in the sides of the hole to begin filling the hole by moving into the valve area. Thus, the valves may be buried and potentially damaged or made inaccessible by the accumulated soil. This may also impair operation of the valves or make them inconvenient to access for maintenance or replacement.

Yet further, many known valve boxes are relatively inflexible in design. Such valve boxes typically have a fixed height; accordingly, the floor of the hole and/or the valves must be disposed at a certain depth in order for the lid of the box to be flush with the surrounding terrain, as is usually desired. The valve box must either be disposed on top of the valves, or the installer must cut openings in the valve box to accommodate the conduits connected to the valves. Accordingly, the installer may be required to dig a deeper hole than is desired, fill in a portion of a hole, and/or assemble the appropriate tools to cut the valve box in the desired manner. These burdensome tasks add significantly to the time required to install the irrigation system.

Hence, it would be an advancement in the art to provide a valve containment apparatus and method that provides enhanced protection from flooding or soil infiltration. It would be a further advancement in the art to provide such a valve containment apparatus and method that enables easy access to the valves. Furthermore, it would be an advancement in the art to provide such an apparatus and method that is flexible, simple, inexpensive, and easy to install.

SUMMARY OF THE INVENTION

The apparatus of the present invention has been developed in response to the present state of the art, and in particular, in response to the problems and needs in the art that have not yet been fully solved by currently available irrigation valve containment systems and methods. Thus, it is an overall objective of the present invention to provide an irrigation valve containment system that remedies the shortcomings of the prior art.

To achieve the foregoing objective, and in accordance with the invention as embodied and broadly described herein in the preferred embodiment, an irrigation system is used to irrigate an area. The irrigation system has a valving system designed to control flows of water to a plurality of water distribution units such as sprinklers. The sprinklers receive water from a plurality of distribution conduits, each of which is in communication with a valve assembly. Each valve assembly has a valve housing and an actuator designed to actuate elements within the valve housing to move the valve assembly between an open configuration and a closed configuration.

Each valve assembly also has a pair of wires that conveys a valve activation signal to the actuator to move the valve assembly between the open and closed configurations. The valve assemblies may be connected to a feeder conduit to form a manifold that receives water from a main line. The manifold may be disposed underground, within a valve containment assembly. The valve containment assembly may be uniquely designed to provide the valve assembly with some protection from water or soil infiltration.

More precisely, the valve containment assembly may be disposed within a hole with a generally rectangular shape. The hole may include a floor and side walls that extend generally upward to ground level from the floor. The valve containment assembly has a standard sized manifold box with a second side wall unit with side walls that cooperate to form a second substantially vertical wall with a generally rectangular shape that corresponds to the generally rectangular shape of the hole.

The side walls may have one or more recesses that permit the main line or water distribution conduits to pass through the side walls to reach the manifold. The manifold box also has a lid that can be removably placed on the second side wall unit to cover the manifold. The manifold box may generally cover the manifold to prevent interference with the manifold from outside the hole.

The valve containment assembly may also have a support in the form of a first side wall unit disposed underneath the manifold box to support the manifold box and elevate the manifold box such that the lid is disposed at ground level. The first side wall unit has side walls that, together, form a first substantially vertical wall with a generally rectangular shape that corresponds to the shape of the hole and the second side wall unit. Like the side walls of the second side wall unit, the side walls of the first side wall unit may have one or more recesses that permit irrigation lines to pass through the side walls of the first side wall unit. The first side wall unit also has a retention shelf that extends around the interior of the side walls.

A grate is disposed on the retention shelf. The grate has a peripheral edge designed to fit within the side walls of the first side wall unit. The grate has a plurality of holes so that irrigation conduits, anchoring mechanisms, or other devices can extend through the grate to connect the manifold with the floor of the hole or with irrigation system components disposed within the first side wall unit. The manifold may rest on the grate. The manifold box may be disposed on top of the first side wall unit and the grate.

Thus, the first side wall unit and the grate cooperate to elevate the manifold above the floor of the hole. Consequently, a considerable amount of water or soil must enter the hole before the water or soil will reach the level of the manifold. The space within the first side wall unit may also provide a greater drainage area for water so that the water is able to drain through the floor before reaching the level of the manifold. Hence, access to the manifold is unobstructed by dirt and debris so that the valves can be repaired or replaced without impediment.

According to one alternative embodiment, a valve containment assembly may have a manifold box including a second side wall unit as described above, which may be used in conjunction with a differently configured first side wall unit. The valve containment assembly may also have a third side wall unit that may be positioned between the first and second side wall units to extend the height of the valve containment assembly, thereby permitting the valve containment assembly to be used with a deeper hole.

The first side wall unit may have a first substantially vertical wall with longitudinal and lateral side walls. The side walls may have a plurality of recesses contiguous with an upwardly disposed first edge of the first substantially vertical wall. Each recess is blocked by a frangible portion that includes two tabs separated from each other and from the remainder of the first substantially vertical wall by regions of reduced wall thickness. The regions of reduced wall thickness can be torn to permit relatively easy removal of the tabs by a user. Each of the lateral side walls may have an enlarged recess covered by an enlarged frangible portion. The enlarged recesses are sized to permit passage of larger-sized conduits into the manifold containment assembly.

The third side wall unit has a third substantially vertical wall that rests on top of the first edge of the first substantially vertical wall, thereby forming a boundary of the recesses. The second side wall unit rests on top of the third side wall unit. The third substantially vertical wall has an upwardly disposed first edge that can receive the second side wall unit in a manner similar to that of the first edge of the first side wall unit. Similarly, the third substantially vertical wall has a downwardly disposed second edge that can mate with the first edge of the first substantially vertical wall in a manner similar to that of the second edge of the second substantially vertical wall. Thus, the third side wall unit simply forms a vertical extension of the valve containment assembly, and can be removed to permit the second side wall unit to rest directly on top of the first side wall unit.

The first side wall unit may have a spanning member in the form of a grate integrally formed with the first substantially vertical wall. When a manifold rests on the grate, the various conduits connected to the manifold are disposed at the proper height to extend through the recesses. The necessary number of recesses may be opened by removing the corresponding tabs. The remaining tabs may be left intact to prevent dirt entry through the corresponding recesses. Accordingly, the first side wall unit may be adapted to be used with a variety of different manifold types, to which varying numbers of conduits may be connected.

According to another alternative embodiment, a valve containment assembly may include the first side wall unit of the previous embodiment. The first side wall unit may be used in conjunction with a jumbo-sized manifold box. The manifold box includes a second side wall unit and a lid that are larger than those of the manifold box of the previous embodiment. Rather than resting on the first edge of the first substantially vertical wall of the first side wall unit, the second side wall unit may rest on gussets extending outward from a lower portion of the first side wall unit. The second side wall unit has a pair of recesses that then align with the enlarged recesses of the first side wall unit to permit larger conduits to extend through the lateral side walls of the first and second side wall units to reach a larger valve resting on the grate of the first side wall unit.

According to another alternative embodiment, a valve containment assembly may include the first side wall unit and the lid of the previous embodiment, and differently configured second and third side wall units. The second side wall unit has a second substantially vertical wall with a comparatively small height to permit the valve containment assembly to be placed in a comparatively shallow hole. A plurality of recesses is formed in the second side wall unit. The recesses may be arranged along a pattern similar to that of the recesses of the first side wall unit. The recesses of the second side wall unit may also be blocked by frangible portions. The recesses may be generally arch-shaped so that the portions of the second substantially vertical wall surrounding the recesses can relatively evenly distribute pressure to the first edge of the first substantially vertical wall.

The second substantially vertical wall may have a retention shelf designed to receive the enlarged lid of the enlarged manifold box of the previous embodiment. The second substantially vertical wall also has retention slots that can be used to help latch the lid in place. The third side wall unit is an optional extension, and accordingly, the retention slots of the second substantially vertical wall can alternatively be used to latch the third side wall unit.

The third substantially vertical wall may have a pair of retention members that extend downward and are able to interlock with the retention slots of the second substantially vertical wall. The third substantially vertical wall also has a retention shelf designed to receive the lid, and a pair of retention slots that can latch the lid in place. The retention slots can alternatively be used to receive retention members of a fourth side wall unit identical to the third side wall unit. Accordingly, an unlimited number of extensions can optionally be attached to the second side wall unit to increase the height of the valve containment assembly.

According to another alternative embodiment of the invention, different first and third side wall units may be used in conjunction with the standard sized valve box and the grate of the first embodiment. The first and third side wall units may have first and third substantially vertical walls, respectively. Each of the first and third substantially vertical walls has a first edge and a second edge, with a set of recesses contiguous to each of the first and second edges. One set of recesses corresponds in size to a manifold to which relatively smaller conduits are connected, while the other set corresponds to a manifold to which relatively larger conduits are connected. The recesses are blocked by frangible portions similar to those described previously.

Each of the recesses is comparatively shallow in the transverse direction, so that recesses of the first and third substantially vertical walls must be aligned and unblocked via removal of the associated frangible portions to permit passage of each conduit. When the second edge of the third substantially vertical wall rests on the first edge of the first substantially vertical wall, the smaller recesses of the first and third substantially vertical walls may be aligned to permit passage of smaller conduits. When the first edge of the third substantially vertical wall rests on the second edge of the first substantially vertical wall, the larger recesses of the first and third substantially vertical walls may be aligned to permit passage of larger conduits.

The first substantially vertical wall has a retention shelf disposed approximately halfway between the first and second edges of the first substantially vertical wall. The grate can rest on either side of the retention shelf. Hence, the first side wall unit can be placed with either of the first and second edges on top, and the retention shelf will be properly positioned to support the manifold adjacent to the upwardly-disposed set of recesses. The first and second edges of the third side wall unit may both be designed to receive the second side wall unit of the manifold box so that the third side wall unit can also be placed with either of the first and second edges on top.

According to another alternative embodiment, the standard sized manifold box of the first embodiment may be used with differently configured first and third side wall units. The first side wall unit may have a first substantially vertical wall with an integrally formed spanning member in the form of a grate extending across the interior of the first substantially vertical wall. The side walls of the first substantially vertical wall may have broad recesses extending along their length.

The third side wall unit also has a third substantially vertical wall with side walls, each of which has a skirt that extends into one of the broad recesses. The skirts have a number of recesses that correspond in size and position to the conduits that will be connected to a manifold. Thus, the third side wall unit is designed for use with one specific manifold type. Different third side wall units may be interchangeably used in connection with the first side wall unit to facilitate use with manifolds to which different numbers of conduits, or conduits of different sizes, are connected. These different third side wall units have different numbers of recesses and/or differently sized recesses.

The third side wall unit has a first edge on which the standard sized manifold box can rest. Thus, the first, third, and second side wall units can be stacked, in that order, and the lid can be placed on the second side wall unit to complete the valve containment assembly.

According to another alternative embodiment, a differently configured third side wall unit may be used in conjunction with the first side wall unit and the standard sized manifold box of the previous embodiment. The third side wall unit may have a third substantially vertical wall with side walls along which a plurality of skirts extend. Each skirt may have an array of slidable cover plates that can be independently moved to block a portion of one of the broad recesses. The slidable cover plates may cooperate to block substantially all of the space provided by the broad recesses.

When the manifold is resting on the grate of the first side wall unit and the manifold has been connected to the corresponding conduits, the third side wall unit may be installed. The third side wall unit may simply be dropped into place over the first side wall unit so that the slidable cover plates that would interfere with the conduits are slid into a retracted position by contact with the conduits. Thus, the third side wall unit can be installed over the first side wall unit in a manner that avoids interference with the conduits and that blocks the spaces between the conduits to prevent dirt from entering the valve containment assembly.

According to yet another alternative embodiment, differently configured first and third side wall units may be used in conjunction with the standard sized manifold box of the first embodiment. The first manifold box may be configured in a manner similar to that of the previous two embodiments, with broad recesses extending along the side walls of the first substantially vertical wall. However, in this embodiment, flexible barriers are seated in the broad recesses.

Similarly, the third side wall unit has a third substantially vertical wall to which flexible barriers are attached. During assembly, the conduits may be connected to the manifold in such a manner that they somewhat deform the flexible barriers of the first side wall unit. The third side wall unit is installed over the first side wall unit in such a manner that the flexible barriers of the third side wall unit are similarly deformed by contact with the conduits. The adjacent edges of the flexible barriers that are not in contact with the conduits may come together to block the spaces between the conduits, thereby keeping dirt from entering the valve containment assembly.

Most of the components of the valve containment assemblies of the invention may be easily manufactured via conventional methods such as injection molding. Installation may be commenced by placing one side wall unit within the hole with the grate, and placing the manifold and related components on the grate. The other side wall unit(s) and/or other elements, such as a lid, may then be installed to cover the manifold. Components such as conduits may be attached to the manifold before or after installation of the other side wall unit(s).

The valve containment assemblies and related methods of the invention provide a greater degree of protection against water and soil contamination of valving system components. Furthermore, the valve containment assemblies are relatively simple, inexpensive, and easy to install. These and other features and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 9, is not intended to limit the scope of the invention, as claimed, but is merely representative of presently preferred embodiments of the invention.

For this application, the phrases "connected to," "coupled to," and "in communication with" refer to any form of interaction between two or more entities, including mechanical, electrical, magnetic, electromagnetic, and thermal interaction. The phrase "attached to" refers to a form of mechanical coupling that restricts relative translation or rotation between the attached objects.

The term "abutting" refers to items that are in direct physical contact with each other, although the items may not be attached together. The terms "integrally formed" refer to a body that is manufactured integrally, i.e., as a single piece, without requiring the assembly of multiple pieces. Multiple parts may be integrally formed with each other if they are formed from a single workpiece.

Figure 1:
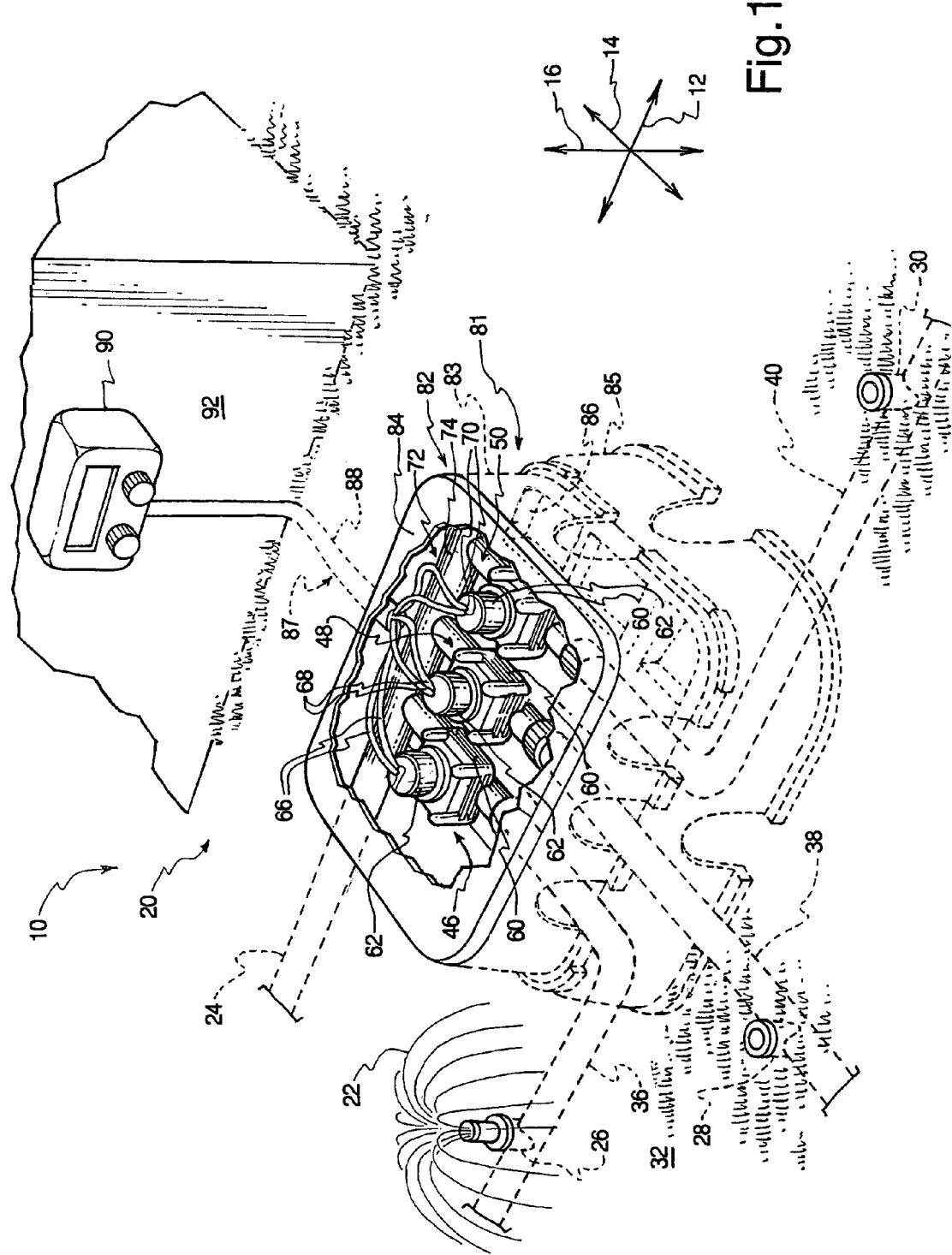
FIG. 1 is a perspective view of a portion of an irrigation system that incorporates an irrigation valve containment assembly according to one embodiment of the invention, showing the lid of the manifold box partially cut away to reveal the manifold and associated conduits, with components that are not directly visible indicated by phantom lines.

Referring to FIG. 1, a perspective view depicts an irrigation system 10 according to one embodiment of the invention. The irrigation system 10 has a longitudinal direction 12, a lateral direction 14, and a transverse direction 16. The irrigation system 10 incorporates a valving system 20, which will be described in greater detail subsequently.

The irrigation system 10 is designed to receive water 22 via a main line 24. In this application, usage of the term "water" is to be taken broadly, as encompassing any fluid that contains a significant proportion of water. Accordingly, "water" may optionally have additives such as fertilizers, pesticides, nutrients, and the like. The water 22 is distributed by a plurality of water distribution units over a patch of land designated for plant growth.

"Water distribution unit" encompasses a variety of devices used to spread irrigation water, such as pop-up sprinkler heads, rotary sprinklers, bubblers, drip irrigation systems, and the like. The irrigation system 10 includes water distribution units in the form of a first sprinkler head 26, a second sprinkler head 28, and a third sprinkler head 30. The sprinkler heads 26, 28, 30 are arrayed to irrigate an area 32.

The first, second and third sprinkler heads 26, 28, 30 are supplied with water by first, second and third distribution conduits 36, 38, 40, respectively. Each of the distribution conduits 36, 38, 40 may extend further to supply additional water distribution units (not shown). In this application, a "conduit" is any structure capable of conducting a fluid under pressure from one location to another.

Water flow to the first, second, and third distribution conduits 36, 38, 40 is controlled by a first valve assembly 46, a second valve assembly 48, and a third valve assembly 50, respectively. The valve assemblies 46, 48, 50 may optionally operate to permit water flow to only one of the conduits 36, 38, 40 at any given time, so that each conduit 36, 38, 40, in turn, receives the full pressure and flow rate of water from the main line 24.

As depicted in FIG. 1, the first valve assembly 46 is in the open configuration to supply water to the first sprinkler head 26 via the first conduit 36. The second and third valve assemblies 48, 50 are in the closed configuration so no significant amount of water flows into the second and third conduits 38, 40, and the second and third sprinkler heads 28, 30 are inactive.

Each of the valve assemblies 46, 48, 50 has a valve housing 60 in fluid communication with the associated distribution conduit 36, 38, or 40. The valve housing 60 contains one or more elements that block or unblock water flow through the valve housing 60. Thus, each of the valve assemblies 46, 48, 50 has a closed configuration, in which water flow is blocked, and an open configuration, in which water flow is comparatively freely permitted.

Each of the valve assemblies 46, 48, 50 also has an actuator 62 attached to the valve housing 60. Each actuator 62 moves the interior elements of the associated valve housing 60 to move the corresponding valve assembly 46, 48, or 50 between the open and closed configurations. The actuator 62 may include an electrically operated device such as a linear or rotary solenoid, piezoelectric actuator, or electric motor. The valve assemblies 46, 48, 50 also include first valve wires 66, second valve wires 68, and third valve wires 70, respectively. Each set of valve wires 66, 68, 70 is coupled to the actuator 62 of the corresponding valve assembly 46, 48, 50.

In this application, the term "valve" generally refers to the combination of the valve housing 60 and the actuator 62.

The term "valve" is not limited to the embodiment shown, but may include a wide variety of actuator and valve housing combinations.

The valve assemblies 46, 48, 50 are interconnected to form a manifold 72, to which the main line 24 and the distribution conduits 36, 38, 40 are attached. More precisely, the manifold 72 includes a feeder conduit 74 that receives water from the main line 24 at one end. The valve assemblies 46, 48, 50 are arranged generally perpendicular to the feeder conduit 74 to receive the water. The manifold 72 is disposed underground and housed within a valve containment assembly 81.

In FIG. 1, the valve containment assembly 81 includes a manifold box 82, which may be disposed generally underground to shield the manifold 72 from external interference. The manifold box 82 has a second side wall unit 83 and a lid 84 designed to removably rest on top of the second side wall unit 83. The lid 84 substantially blocks access to the interior of the valve containment assembly 81 by keeping people or objects from interfering with the valve assemblies 46, 48, 50. The lid 84 may be removed, either by hand or through the use of appropriate tools, to provide access to the manifold 72 for repairs or maintenance.

The manifold box 82 is disposed on top of a first side wall unit 85 that acts as a support platform by elevating the manifold box 82. A spanning member, in the form of a grate 86, is retained in the upper portion of the first side wall unit 85, and the manifold 72 rests on top of the grate 86. Thus, the manifold 72 does not rest directly on the ground; rather, it is elevated somewhat from the immediate ground so that flooding, soil intrusion, and the like are unable to damage the manifold 72. In this application, a "spanning member" is any structure that spans the interior of a side wall unit. At least a portion of a valve may rest on a spanning member, directly or indirectly, to keep the portion from resting on the ground. The configuration and operation of the valve containment assembly 81 will be shown and described in greater detail subsequently.

A plurality of control unit wires 87 are connected to valve wires 66, 68, 70. Except at the ends, the control unit wires 87 are covered by a sheath 88 designed to gather and protect the control wires 87. The control unit wires 87 extend from the valve wires 66, 68, 70 to a control unit designed to transmit valve activation signals through the control wires 87. As depicted, the valve wires 66, 68, 70 are connected to the control unit wires 87 via conventional wire nuts. If desired, the control wires 87 may alternatively be coupled to the valve wires 66, 68, 70 via some type of electrical junction unit (not shown).

The control unit may take the form of a timer 90, as illustrated in FIG. 1. The timer 90 transmits the valve activation signals via the control unit wires 87 according to a schedule established by a user. The phrase "control unit" is not limited to a timer, but may include any other device that transmits a valve activation signal. Such devices include simple switches, remote receivers, control system processors designed to measure variables and control operation of the irrigation system 10 based on those variables, and the like. The timer 90 may be attached to a wall 92 near the manifold box 82, as shown, or may be disposed at a remote location.

As mentioned previously, the valve containment assembly 81 is designed to elevate the manifold 72 from the surrounding soil so that the manifold 72 is less easily interfered with by flooding or soil encroachment. The manner in which the valve containment assembly 81, the first side wall unit 85, and the grate 86 are designed to provide these benefits will be shown and described in greater detail in connection with FIG. 2.

Figure 2:
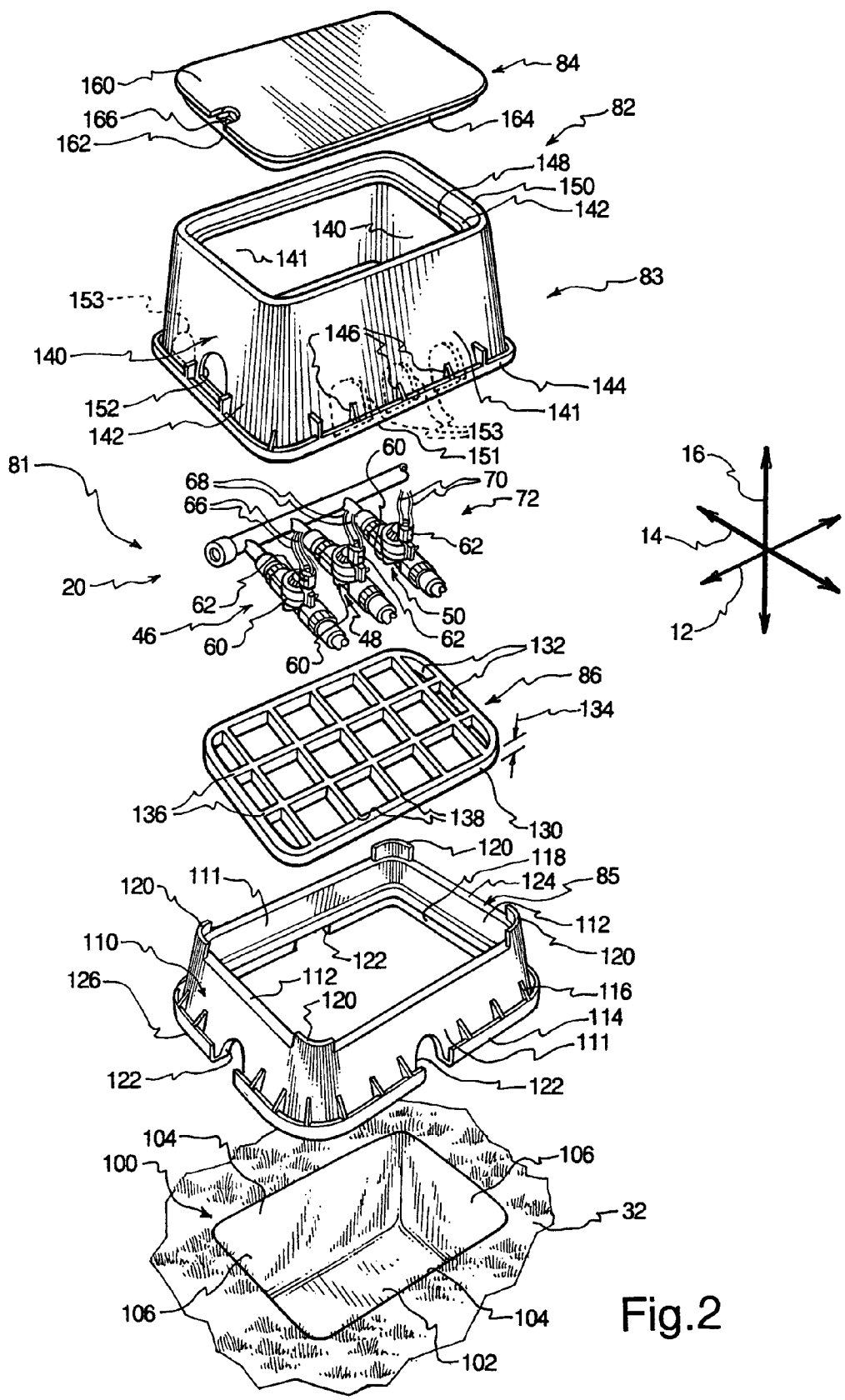
FIG. 2 is an exploded, perspective view of the valve assembly and the valve containment assembly of the irrigation system of FIG. 1, adjacent to a hole in which the valve containment assembly may be installed.

Referring to FIG. 2, an exploded, perspective view illustrates the valve containment assembly 81 in greater detail. As shown, the valve containment assembly 81 is designed to house the valving system 20 within a hole 100 formed in the area 32. The hole 100 has a floor 102, longitudinal side walls 104, and lateral side walls 106, each of which has a generally rectangular shape. In alternative embodiments, valve containment assemblies according to the invention may be provided to fit within holes with a variety of rounded or flat-sided shapes. Thus, side wall units of the invention need not be generally rectangular, but may have other shapes including but not limited to circular, elliptical, semicircular, trapezoidal, and triangular shapes.

In the configuration of FIGS. 1 and 2, the floor 102 of the hole 100 provides a base plane on which the valve containment assembly 81 rests. In this application, the term "base plane" is broadly interpreted as a plane on which a valve containment assembly rests. A base plane is flat, but need not be exactly horizontal. The valve containment assembly may rest on a surface that is not planar. In such a case, the corresponding base plane is simply the plane on which the valve containment assembly could rest in place of the surface without changing the position or orientation of the valve containment assembly. The floor 102 of FIG. 2 is planar and thus illustrates one example of a base plane.

The first side wall unit 85 has a generally rectangular shape that corresponds to the shape of the floor 102 of the hole 100. Supports with different shapes may be used to suit holes of different shapes. The first side wall unit 85 has a first substantially vertical wall 110. In this application, a "substantially vertical wall" is a wall that is angled with a vertical component that is greater than the horizontal component. Accordingly, any wall angled from a horizontal plane by more than forty-five degrees may is "substantially vertical."

Since the first side wall unit 85 may be injection molded, it is anticipated that the first substantially vertical wall 110 may not be precisely vertical, but may instead have a taper, or "draft," to facilitate removal of the first side wall unit 85 from the injection molding equipment. The first substantially vertical wall 110 encircles (i.e., forms the longitudinal and lateral boundaries for) an interior space within the first side wall unit 85. The grate 86 spans the interior space, which means that the grate 86 extends between at least two different positions on the interior of the first substantially vertical wall 110, and in doing so, crosses some portion of the interior space.

The first substantially vertical wall 110 includes a pair of longitudinal side walls 111 extending along the longitudinal direction 12 and a pair of lateral side walls 112 extending along the lateral direction 14. The first side wall unit 85 has a peripheral lip 114 extending around the exterior of the lower edges of the side walls 110, 112. The peripheral lip 114 provides a blunt surface to abut the floor 102 so that the side walls 111, 112 are not driven excessively into the floor 102 in response to downward pressure on the valve containment assembly 81. The peripheral lip 114 is supported by a plurality of gussets 116 formed generally perpendicular to the peripheral lip 114 and the side walls 111, 112. The gussets 116 provide structural support to the peripheral lip 114.

The first side wall unit 85 has a retention shelf 118 extending around the interior of the first substantially vertical wall 110. The retention shelf 118 protrudes inward from the side walls 111, 112 to support the grate 86. Furthermore, the first side wall unit 85 has alignment cleats 120 distributed around the tops of the side walls 111, 112, with one alignment cleat 120 at each corner. The alignment cleats 120 are arc-shaped in a manner that corresponds with the curvature of the corners of the first side wall unit 85.

The longitudinal side walls 111 and/or the lateral side walls 112 may have recesses 122 shaped in such a manner that irrigation system components such as the main line 24 and the distribution conduits 36, 38, 40 can pass from the side walls 104, 106 of the hole 100 into the interior of the first side wall unit 85.

The side walls 111, 112 may simply be formed with the recesses 122 in place. Alternatively, the recesses 122 may be cut, stamped, punched, or otherwise formed in the side walls 111, 112, either as part of the manufacturing process, or by the installer after purchase. Formation of the recesses 122 by the installer facilitates use of the first side wall unit 85 for manifolds having various numbers of valve assemblies. For example, if the first side wall unit 85 is used with a manifold having only two valve assemblies, only two recesses 122 need be formed in the longitudinal side walls 111. The recesses 122 may alternatively be omitted altogether if no irrigation system components need to pass through the first substantially vertical wall 110.

The first substantially vertical wall 110 also has a first edge 124 that extends around the uppermost periphery of the first substantially vertical wall 110. The first edge 124 is somewhat thick because the side walls 111, 112 effectively curve inward to form the first edge 124 and then downward to form the retention shelf 118. Thus, the first side wall unit 85 is integrally formed, and may easily be made from a plastic material by a method such as injection molding or blow molding. Two cooperating molds may be used, and may be withdrawn along the transverse direction 16 after the molding process is completed without interference from the newly formed first side wall unit 85. The first side wall unit 85 may also be made of other materials such as corrosion resistant metals, ceramics, elastomers, wood, and/or composite materials.

A second edge 126 of the first substantially vertical wall 110 is defined by the peripheral lip 114, and is disposed on the lowermost periphery of the first substantially vertical wall 110. The grate 86 may have a peripheral edge 130 sized to fit within the first edge 124 of the first side wall unit 85. Thus, the grate 86 is able to rest on the retention shelf 118 of the first side wall unit 85. The top of the grate 86 may then optionally be flush with the first edge 124 of the first side wall unit 85.

As shown, the grate 86 has a plurality of holes 132 that provide communication between the interior of the first side wall unit 85 and the valving system 20. The manifold 72 may rest directly on the grate 86; this means that the grate 86 may directly contact the manifold 72 in addition to supporting at least a portion of its weight. This is in contrast to conventional systems, in which the manifold rests directly on the floor of a hole.

The holes 132 may be sized such that the main line 24 or the distribution conduits 36, 38, 40 are able to extend through the holes 132 to reach the valving system 20 from the interior of the first side wall unit 85. For example, distribution conduits 36, 38, 40 and/or the main line 24 may enter the interior of the first side wall unit 85 along a generally horizontal direction via the recesses 122. Elbow joints (not shown) or the like may be used to connect the distribution conduits 36, 38, 40 and/or the main line 24 to generally vertical transfer conduits (not shown). The transfer conduits may connect to the manifold 72, either directly or via additional elbow joints or the like.

The control unit wires 87 or other implements may also extend through the holes 132 to reach the manifold 72 from the space within the first side wall unit 85. The first side wall unit 85 and grate 86 therefore may easily be used to provide extra space and flexibility for connecting various implements to the manifold 72. If desired, a second manifold (not shown) may even be disposed within the interior of the first side wall unit 85 so that two manifolds are housed within the valve containment assembly 81, one on top of the other.

The grate 86 has a thickness 134 in the transverse direction 16. If desired, the thickness 16 may be large enough that the grate 86 is usable without the first side wall unit 85 to protect the valving system 20 from interference due to soil or water buildup. Soil, water, and other items may simply fall into the holes 132, and may be prevented from rising to the level of the valving system 20 by the thickness 134 of the grate 86. In the embodiment of FIG. 2, the grate 86 is made up of longitudinal members 136 and lateral members 138 that extend in the longitudinal and lateral directions, respectively. In alternative embodiments, a spanning member may include members that extend at oblique angles, curved members, and/or other structures that cross the interior of the first side wall unit 85 to directly support a manifold such as the manifold 72 of FIG. 2.

Like the first side wall unit 85, the grate 86 may also be made of a plastic material via blow molding, injection molding, or the like. Multiple molds may be used, and may retract from the newly formed grate 86 along the transverse direction 16 without interference. The grate 86 may also be formed of other materials besides plastics such as corrosion resistant metals, ceramics, elastomers, and composite materials.

As shown, the second side wall unit 83 has a rectangular shape somewhat similar to that of the first side wall unit 85. More precisely, the second side wall unit 83 has a second substantially vertical wall 140 that includes a pair of longitudinal side walls 141 and a pair of lateral side walls 142 disposed along the longitudinal and lateral directions 12, 14, respectively. A peripheral lip 144 extends around the lower edges of the side walls 141, 142 to provide a relatively strong support structure for the remainder of the second side wall unit 83. The strength of the first and second side wall units 85, 83 may be selected such that a person can stand on the lid 84 of the assembled valve containment assembly 81 without causing any damage or shifting of the valve containment assembly 81.

The peripheral lip 144 permits the second side wall unit 83 to be disposed within a hole without the first side wall unit 85 in such a manner that the side walls 141, 142 rest on the ground without penetrating progressively further into the ground in response to downward pressure on the second side wall unit 83. Without the first side wall unit 85, the second side wall unit 83 may be used with or without the grate 86. Indeed, if desired, only the grate 86 may be omitted so that the manifold 72 is suspended over the first side wall unit 85 by the attached distribution conduits 36, 38, 40 and the main line 24.

The peripheral lip 144 is sized such that the second side wall unit 83 is able to mate with the first side wall unit 85. More precisely, the peripheral lip 144 may have approximately the same shape and size as the first edge 124 of the first substantially vertical wall 110 so that the peripheral lip 144 lies against the first edge 124 when the second side wall unit 83 is disposed on top of the first side wall unit 85. The alignment cleats 120 are positioned around the corners of the second side wall unit 83 so that the second side wall unit 83 is unable to slide with respect to the first side wall unit 85 in the longitudinal or lateral directions 12, 14 without first moving away from the first side wall unit 85 in the transverse direction 16.

Like the first side wall unit 85, the second side wall unit 83 has a plurality of gussets 146 that support the peripheral lip 144. The second side wall unit 83 also has a retention shelf 148 extending inward from the side walls 141, 142 to support the lid 84.

The side walls 141, 142 of the second side wall unit 83 also define a first edge 150 with a blunted shape. The first edge 150 may be formed in a manner similar to that of the first edge 124 of the first side wall unit 85. More precisely, the side walls 141, 142 of the second side wall unit 83 may extend inward to define the first edge 150, and then downward to define the retention shelf 148.

The side walls 141, 142 of the second substantially vertical wall 140 also define a second edge 151 at the lowermost portion of the side walls 141, 142. When the valve containment assembly 81 is assembled, the second edge 151 of the second side wall unit 83 rests on the first edge 124 of the first side wall unit 85. The second edge 151 abuts the first edge 124 of the first side wall unit 85 in non-overlapping function because the second edge 151 rests on the first edge 124, rather passing inward or outward of the first edge 124 during assembly.

Recesses 152 similar the recesses 122 are formed in the lateral side walls 142 of the second side wall unit 83. Unlike the recesses 122, the recesses 152 do not sever the first edge 124 of the first side wall unit 85. The recesses 152 may be formed as part of a molding process or formed after molding via removal of plastic, either as part of the manufacturing process, or by the installer. Recesses (not shown) may additionally or alternatively be pre-formed in the longitudinal side walls 141 of the second side wall unit 83.

The recesses 152 perform a function similar to that of the recesses 122 of the first side wall unit 85. More specifically, the recesses 152 permit the main line 24, the distribution conduits 36, 38, 40, the control unit wires 87, and/or other implements to pass from the side walls 104, 106 of the hole 100 and into the interior of the second side wall unit 83 for coupling to the manifold 72. Thus, it is optional for any component of the irrigation system 10 to pass through the interior of the first side wall unit 85. If desired, all parts that are connected to the manifold 72 may instead pass through the recesses 152 and/or other recesses to reach the manifold 72 directly.

If desired, additional recesses 153 may be formed by the user to add flexibility in placement of the manifold 72 within the second side wall unit 83. Such additional recesses 153, which are shown in phantom in FIG. 2, may easily be cut into the side walls 141, 142 by the user at any desirable location. In the alternative to the recesses 153 shown in FIG. 2, which encompass portions of the peripheral lip 144, recesses may be formed closer to the first edge 150 to avoid cutting into the peripheral lip 144. As illustrated, the recesses 153 are disposed at the positions at which the main line 24 and the distribution conduits 36, 38, 40 will actually pass through the side walls 140, 142 of the second side wall unit 83. The main line 24 and the distribution conduits 36, 38, 40 may alternatively be diverted or otherwise positioned to pass only through the recesses 152 in the centers of the lateral side walls 142.

The second side wall unit 83 may also be integrally made of plastic by injection or blow molding in much the same manner as the first side wall unit 85. Alternative materials and/or manufacturing processes may also be used.

The lid 84 has a top side 160 with a generally rectangular shape corresponding to the shape of the second side wall unit 83. The lid 84 also has a bottom side 162 and a peripheral edge 164 that connects the top and bottom sides 160, 162. A portion of the bottom side 162 extends downward to fit within the first edge 150 of the second side wall unit 83 in such a manner that the lid 84 can be placed on the retention shelf 148 of the second side wall unit 83. The periphery of the bottom side 162 of the lid 84 may then lie substantially flush with the first edge 150 of the second side wall unit 83.

The top side 160 may be generally flush with the ground level of the area 32, so that the lid 84 is disposed at ground level. The lid 84 may have an access hole 166 or some other feature designed to facilitate removal of the lid 84 by a user to access the manifold 72 for manual operation or maintenance. The second side wall unit 83 may have an interlock mechanism or the like that is designed to cause the lid 84 to be retained until the proper force or tool is applied. The lid 84 may also be easily manufactured from a plastic material by blow molding, injection molding, or the like. Alternatively, the lid 84 may be made from different materials and/or manufactured using different methods.

The valve containment assembly 81 may be installed in the hole 100 according to many different methods. One such exemplary method will be described as follows, with reference to the various parts described previously.

If components of the irrigation system 10 are to be disposed within the first side wall unit 85, they may first be positioned within the hole 100, in the space that will be occupied by the first side wall unit 85. As mentioned previously, these components may include the main line 24, the distribution conduits 36, 38, 40, the control unit wires 87, and/or even a second manifold (not shown). The first side wall unit 85 may then be positioned, with the peripheral lip 114 against the floor 102 of the hole 100. The first side wall unit 85 may be positioned in such a manner that the components present within the hole 100 enter the interior of the first side wall unit 85 via the recesses 122 of the first side wall unit 85.

Then, if components of the irrigation system 10 are disposed within the interior of the first side wall unit 85 and are to be connected to the manifold 72, they may be positioned to extend upward through the first edge 124 of the first side wall unit 85 in such a manner that they will not interfere with placement of the grate 86. More precisely, such components may be disposed to extend through the holes 132 of the grate 86 when the grate 86 is in position. The grate 86 may then be positioned to rest on the retention shelf 118, within the first edge 124 of the first side wall unit 85.

When the grate 86 is in position, the manifold 72 may be disposed to rest on the grate 86. Any components that are to extend through the side walls 104 of the hole 100 to connect to the manifold 72 are also positioned and possibly connected to the manifold 72 in such a manner that the components will pass through the recesses 152 and/or the additional recesses 153 of the second side wall unit 83 when the second side wall unit 83 is in position. Any components that extend upward through the grate 86 may also be coupled to the manifold 72.

When the manifold 72 is in position and connected to all or most of its various components, the second side wall unit 83 may be placed on the first side wall unit 85 in such a manner that the peripheral lip 144 of the second side wall unit 83 rests against the first edge 124 of the first side wall unit 85. The peripheral lip 144 is retained by the alignment cleats 120 in the manner described above. If any remaining components need to be connected to the manifold 72, for example, through the recesses 152 of the second side wall unit 83, they may then be connected. The lid 84 may then be placed to rest on the retention shelf 148 of the second side wall unit 83.

As illustrated, the valve containment assembly 81 is tapered in such a manner that the lid 84 is smaller than the peripheral lip 114 of the first side wall unit 85. Thus, after placement of the valve containment assembly 81, a gap remains between the upper portions of the valve containment assembly 81 and the side walls 104 of the hole 100. Additional soil may be added into this gap until the hole 100 is generally closed about the valve containment assembly 81.

As mentioned previously, a valve containment assembly according to the invention may be provided in a number of different ways. For example, the first side wall unit 85 may be omitted. The grate 86 may then rest directly on the floor 102 of the hole 100, or may rest on other elements such as wooden blocks or gravel (not shown) within the hole 100. Alternatively, the grate 86 may be omitted and the manifold 72 may be supported by the elements coupled to it. The manifold 72 therefore need not necessarily rest on the grate 86.

If desired, the first side wall unit 85 and the grate 86 may be made compatible with existing, standard manifold boxes. Such manifold boxes typically are sold in twelve inch and twenty inch sizes, classified by the depth of the box. Twelve inch boxes may fit directly on the first edge 124 of the first side wall unit 85, as described above in connection with placement of the second side wall unit 83 on the first side wall unit 85. Twenty inch boxes, however may be somewhat larger in the longitudinal and lateral directions 12, 14 than the first edge 124. If desired, support flanges or the like (not shown in FIG. 2) may be shaped to extend from the side walls 110, 112 of the first side wall unit 85 in such a manner that the bottom of a twenty inch box can rest on the gussets support flanges. Such a configuration will be shown and described in connection with FIGS. 3 and 4.

Figure 3:
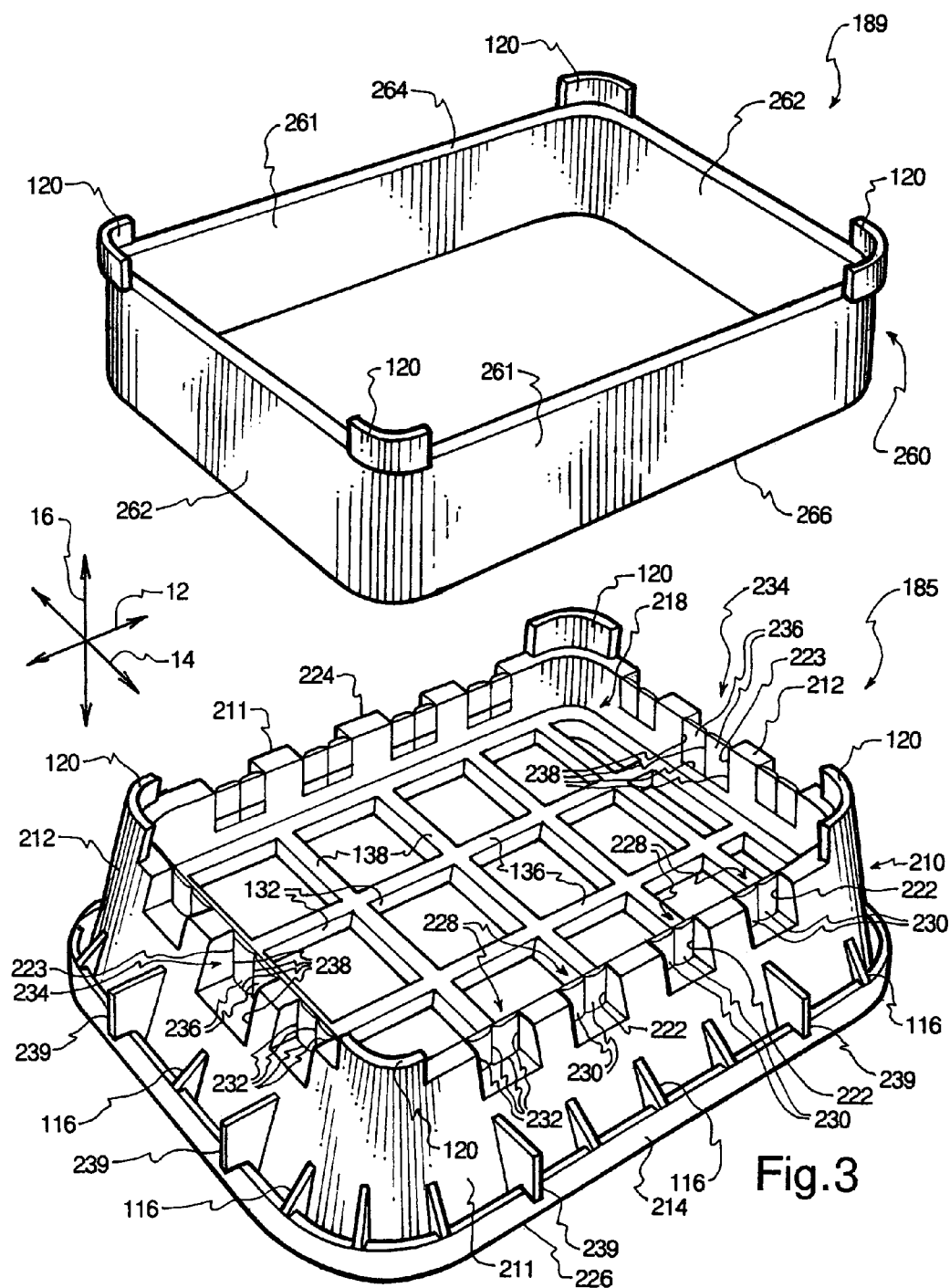
FIG. 3 is an exploded, perspective view of a first side wall unit and a third side wall unit that may be used in conjunction with the manifold box of FIG. 2 to provide an alternative embodiment of a valve containment assembly according to the invention.

Referring to FIG. 3, a perspective view illustrates a first side wall unit 185 and a third side wall unit 189 that may be used in conjunction with the manifold box 82 of FIGS. 1 and 2 to form a valve containment assembly according to one alternative embodiment of the invention. The first side wall unit 185 may act as a support to the manifold box 82, while the third side wall unit 189 acts as an optional, modular extension to provide additional height. The first side wall unit 185 may thus be placed on the floor 102 of the hole 100, and the third side wall unit 189 may optionally be placed on top of the first side wall unit 185. The second side wall unit 83 of the manifold box 82 may be disposed on top of the third side wall unit 189, or if the third side wall unit 189 has been omitted, on top of the first side wall unit 185.

The first side wall unit 185 has a first substantially vertical wall 210 with a generally rectangular shape. The first substantially vertical wall 210 includes a pair of longitudinal side walls 211 and a pair of lateral side walls 212. Additionally, the first side wall unit 185 has a peripheral lip 214 that extends outward from the first substantially vertical wall 210 and curls upward to block vertical motion of the first side wall unit 185 when the first side wall unit 185 is buried. The first side wall unit 185 also has an array of gussets 116, like those of the previous embodiment, that provide structural reinforcement.

The first side wall unit 185 also includes a spanning member in the form of a grate 218, which is integrally formed with the first substantially vertical wall 210. The first substantially vertical wall 210 may thus form a peripheral edge of the grate 218. Like the grate 118 of the previous embodiment, the grate 218 has holes 132 defined by the intersection of longitudinal members 136 and lateral members 138. Additionally, the first side wall unit 185 has four alignment cleats 120 like those of the previous embodiment, that enable the third side wall unit 189 or the second side wall unit 83 to seat firmly against the first side wall unit 185 without permitting relative motion in the longitudinal or lateral directions 12, 14.

As shown, the first substantially vertical wall 210 has a plurality of recesses 222 distributed about its periphery. The recesses 222 may be generally rectangular in shape, and each of the recesses 222 may be sized to permit passage of a conduit up to a certain maximum size, such as one-and-a-half inches. In this application, the term "recess" includes any portion of the wall that retreats from the surrounding outward-facing or inward-facing surfaces of the wall. Thus, a recess may be simply an indentation, a through hole, or some combination of the two. The first edge 224 of the first substantially vertical wall 210 forms the upper boundary of the recesses 222.

Additionally, each of the lateral side walls 212 has one enlarged recess 223 positioned at the top center thereof. The enlarged recesses 223 may be sized to permit passage of conduits larger than the maximum size that can pass through the recesses 222, and may thus, for example, be sized to receive conduits larger than one-and-a-half inches.

The first substantially vertical wall 210 has a first edge 224 that is generally upwardly disposed, at least when the first side wall unit 185 is oriented as shown in FIG. 3. The first substantially vertical wall 210 also has a second edge 226 that is generally downwardly disposed. Thus, when the first substantially vertical wall 210 is placed in the hole 100, the second edge 226 rests on the floor 102 of the hole 100 and the first edge 224 receives the third side wall unit 189 or the second side wall unit 83. The recesses 222 are spaced from the second edge 226, and therefore will be spaced from the floor 102 of the hole 100 when the first side wall unit 185 is installed.

A plurality of frangible portions 228 may be positioned generally within or adjacent to each of the recesses 222 to block entry of material into the interior of the first side wall unit 185 through the recesses 222. Each of the frangible portions 228 is designed to be removable to permit a conduit to pass through the associated recess 222. More precisely, each of the frangible portions 228 has a pair of tabs 230 separated from each other and from the remainder of the first substantially vertical wall 210 by regions of reduced wall thickness 232. The regions of reduced wall thickness 232 can easily be torn to permit manual removal (i.e., removal by hand) of the associated tabs 230, thereby unblocking the adjacent recess 222.

In this application, the phrase "frangible portion" should be broadly interpreted to include any structure having a deliberately reduced mechanical strength. Thus, a frangible portion may include elements with reduced thickness and/or elements weakened by perforation, scoring, high temperature treatment, low temperature treatment, or other methods.

The enlarged recesses 223 are similarly blocked by enlarged frangible portions 234 of the first substantially vertical wall 210. Like the frangible portions 228, each of the enlarged frangible portions 234 has a pair of tabs 236 separated from each other and from the remainder of the first substantially vertical wall 210 by regions of reduced wall thickness 238 that can be torn to permit the tabs 236 to be torn away. Thus, the enlarged recesses 223 can be unblocked in a manner similar to that of the recesses 222.

The first side wall unit 185 also has a plurality of supports 239 that extend outward from the first substantially vertical wall 210. A jumbo valve box may be disposed to rest on the supports 239, as will be shown and described in connection with FIG. 4.

The third side wall unit 189 has a third substantially vertical wall 260, which also has a generally rectangular shape. The third substantially vertical wall 260 has a pair of longitudinal side walls 261 and a pair of lateral side walls 262. Additionally, the third substantially vertical wall 260 has a first edge 264, which is upwardly disposed in the orientation shown in FIG. 3. A second edge 266 of the third substantially vertical wall 260 is downwardly disposed.

The third substantially vertical wall 260 has four alignment cleats 120 like those of the first substantially vertical wall 210. As mentioned previously, the third substantially vertical wall 260 is designed to operate as an optional vertical extension, and accordingly, may be disposed between the first and second side wall units 185, 83. Thus, the first edge 224 of the first substantially vertical wall 210 may receive the second edge 151 of the second substantially vertical wall 140, or the second edge 266 of the third substantially vertical wall 260. The first edge 264 of the third substantially vertical wall 260 may also receive the second edge 151 of the second substantially vertical wall 140.

Furthermore, the valve containment assembly of FIG. 3 is not limited to a single vertical extension. Rather, an unlimited number of additional side wall units identical to the third side wall unit 189 (e.g., fourth, fifth, and sixth side wall units, etc.) may be interposed between the first and second side wall units 185, 83 to provide additional height. Thus, the first edge 264 of the third substantially vertical wall 260 is also shaped to receive an edge identical to its own second edge 266.

Like the parts previously described, the first and third side wall units 185, 189 of FIG. 3 may be manufactured via injection molding or the like. The grate 218 may be formed unitarily with the first substantially vertical wall 210. More precisely, plastic material may be injected into a portion of a mold corresponding to the grate 218, from which the plastic flows outward to form the first substantially vertical wall 210. The grate 218 thus acts as a network of sprues during molding to convey plastic to form the first substantially vertical wall 210, including the alignment cleats 120. Additional plastic is injected to form the grate 218, which is then integral with the first substantially vertical wall. In the alternative to the grate 218, other spanning members (not shown) such as single cross-beams, plates, and the like may be formed within a side wall unit in a similar manner.

The resulting valve containment assembly may be installed by, first, placing the first side wall unit 185 in the hole 100, and placing the manifold 72 (or another, differently configured manifold) on the grate 218. The tabs 230 and/or tabs 236 may be broken out of the recesses 222 and/or enlarged recesses 223 aligned with the valve assemblies 46, 48, 50 (from FIGS. 1 and 2) and with the feeder conduit 74 (also from FIGS. 1 and 2).

The distribution conduits 36, 38, 40 and the main line 24 may be inserted into the recesses 222 and/or enlarged recesses 223 and attached to the manifold 72. The third side wall unit 189 may then be disposed to rest on the first edge 224 of the first side wall unit 185, and the manifold box 82 may be placed on top of the first edge 264 of the third side wall unit 189. The remainder of the hole 100 may then be filled to complete the installation.

Figure 4:
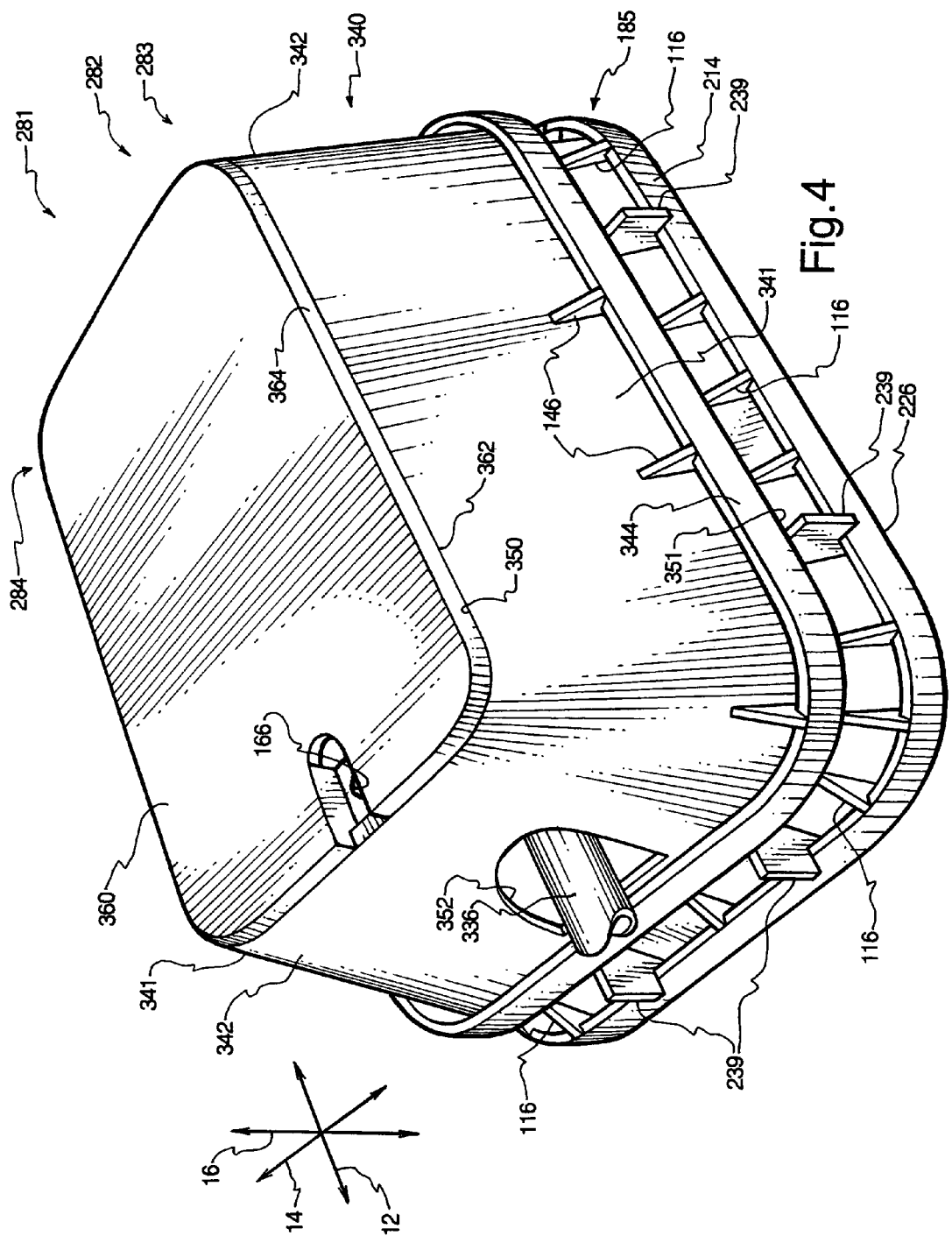
FIG. 4 is a perspective view of the first side wall unit of FIG. 3, used in conjunction with an enlarged manifold box to provide another alternative embodiment of a valve containment assembly according to the invention.

Referring to FIG. 4, a perspective view illustrates a valve containment assembly 281 according to another alternative embodiment of the invention. As shown, the valve containment assembly 281 includes a jumbo sized manifold box 282, which is used in conjunction with the first side wall unit 185 of the embodiment of FIG. 3. The manifold box 282 includes a second side wall unit 283 and a lid 284. The second side wall unit 283 and the lid 284 may have shapes similar to those of the second side wall unit 83 and the lid 84 of the first embodiment, but may be larger in size. The manifold box 282 may be designed to hold larger valves, such as valves commonly used in-line with two-inch conduits. The valve is not shown in FIG. 4, but one of the conduits 336 is illustrated.

The second side wall unit 283 may have a second substantially vertical wall 340 that includes a pair of longitudinal side walls 341 and a pair of lateral side walls 342. The second side wall unit 283 also has a peripheral lip 344 that extends outward from the second substantially vertical wall 340. Gussets 146 extend between the second substantially vertical wall 340 and the peripheral lip 344 to provide structural support. The second substantially vertical wall 340 has a first edge 350 that is upwardly disposed in the orientation of FIG. 4, and a second edge 351 that is downwardly disposed. The second edge 351 rests on the gussets supports 239 of the first side wall unit 185.

Each of the lateral side walls 342 has a recess 352. Each of the lateral side walls 342 may be formed only in the lateral side walls 342, as shown, and may not be contiguous with the second edge 351 due to the fact that the peripheral lip 344 is unbroken. In alternative embodiments, the peripheral lip 344 may be broken to provide a recess contiguous with the second edge 351.

In either case, the conduit 336 extends through the enlarged recess 223 (see FIG. 3) of the corresponding lateral side wall 212 of the first side wall unit 185, and through the recess 352 of the second side wall unit 283. Each recess 352 may be generally aligned with the corresponding enlarged recess 223. The enlarged frangible portion 234 is removed from the enlarged recess 223 to permit passage of the conduit 336 through the lateral side wall 212.

The lid 284 has a top side 360 and a bottom side 362, a portion (not shown) of which protrudes downward to rest against a retention shelf (not shown) that extends inward from the second substantially vertical wall 340. The lid 284 also has a peripheral edge 364 that may be exposed when the lid 284 is in place. The lid 284 also has an access hole 166 through which the lid 284 can easily be unlatched, by hand or through the use of one or more tools.

As with parts previously described, the second side wall unit 283 and the lid 284 may be manufactured by injection molding or the like. The valve containment assembly 281 may be installed by first, inserting the first side wall unit 185 into the hole 100. An enlarged, single-valve manifold may then be positioned on the grate 218 (shown in FIG. 3) of the first side wall unit 185, and the enlarged recesses 223 may be opened by removing the adjacent tabs 236 of the enlarged frangible portions 234.

The manifold box 282 may then be placed on the supports 239 of the first side wall unit 185, and the conduits 336 may be inserted through the enlarged recesses 223 of the first side wall unit and through the recesses 352 of the second side wall unit 283 and connected to the manifold. The remainder of the hole 100 may then be filled in to complete the installation.

Figure 5:
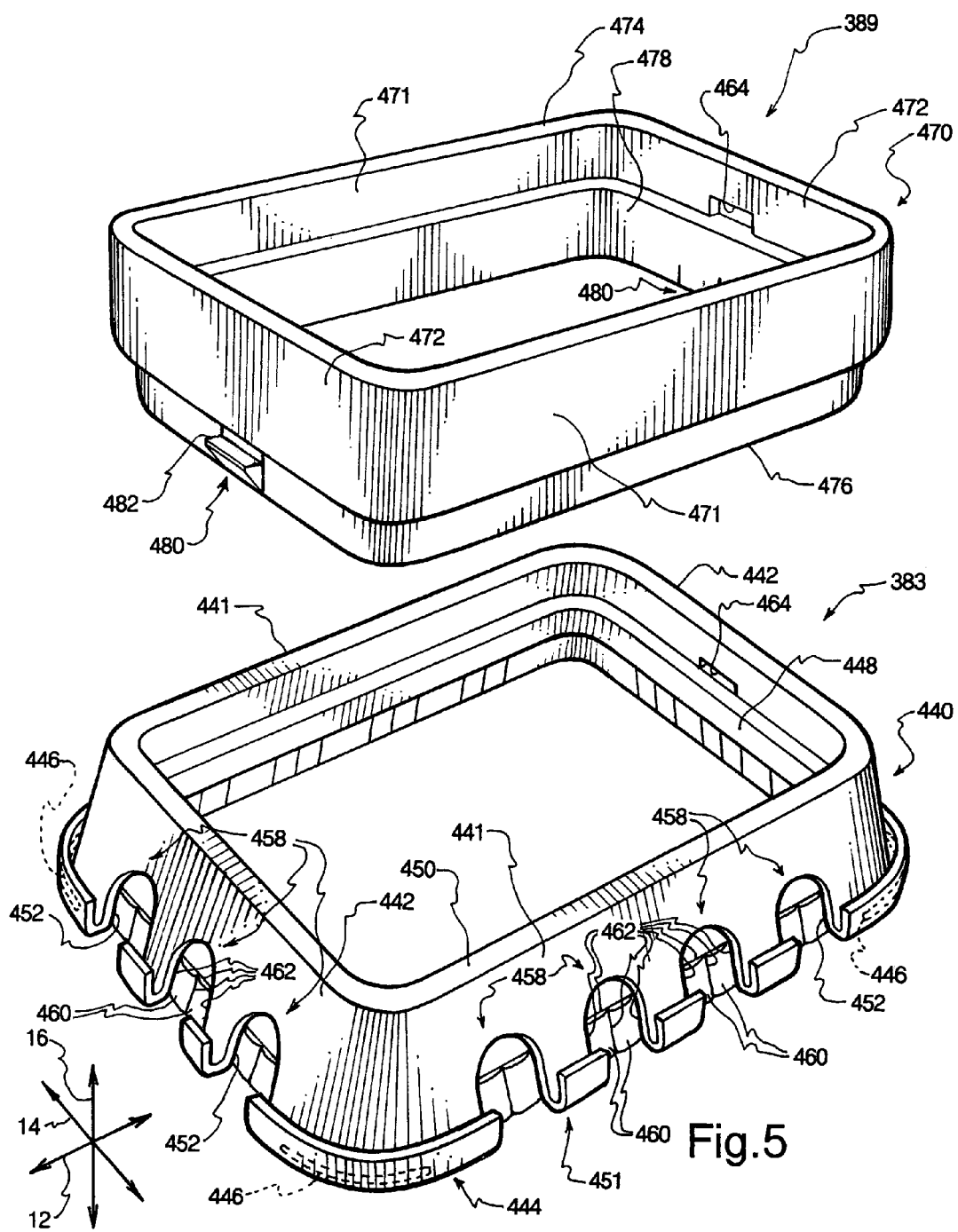
FIG. 5 is an exploded, perspective view of second and third side wall units that may be used in conjunction with the first side wall unit of FIG. 3 to provide another alternative embodiment of a valve containment assembly according to the invention.

Referring to FIG. 5, a perspective view illustrates a second side wall unit 383 and a third side wall unit 389 that may alternatively be used in conjunction with the first side wall unit 185 of FIGS. 3 and 4 and the lid 284 of FIG. 4 to form a valve containment assembly according to another alternative embodiment of the invention. The second side wall unit 383 is comparatively shallow, i.e., the second side wall unit 383 has a comparatively small height in the transverse direction 16. This allows the second side wall unit 383 to be used in relatively shallow holes. The third side wall unit 389 is an optional extension that may be used to adapt the second side wall unit 383 to placement in deeper holes.

The second side wall unit 383 has a second substantially vertical wall 440 that includes a pair of longitudinal side walls 441 and a pair of lateral side walls 442. The second side wall unit 383 also has a peripheral lip 444 extending outward from the second substantially vertical wall 440. A plurality of slots 446 are formed in the peripheral lip 444 at locations that correspond with the relative positions of the alignment cleats 120 of the first side wall unit 185. The second substantially vertical wall 440 also has a retention shelf 448 that extends inward to support the lid 284 in a manner similar to that of the second side wall unit 283.

The second substantially vertical wall 440 has a first edge 450 that is upwardly disposed in the orientation of FIG. 5, and a second edge 451 that is downwardly disposed. The second substantially vertical wall 440 also has a plurality of recesses 452 that are distributed about its perimeter. Each of the recesses 452 has a generally arcuate shape that provides for relatively even distribution of loading from the first edge 450 to the various surfaces of the second edge 451. Each of the recesses 452 may optionally have an arcuate flange or other structure that helps to carry and distribute the load.

The second substantially vertical wall 440 also has a plurality of frangible portions 458 that are positioned to cover the recesses 452. The frangible portions 458 are similar to the frangible portions 228 of the first side wall unit 185. More precisely, each of the frangible portions 458 has a pair of tabs 460 that are connected to each other and to the remainder of the second substantially vertical wall 440 by regions of reduced wall thickness 462. A region of reduced wall thickness 462 may be torn to remove the tabs 460 from any of the recesses 452, thereby permitting passage of a conduit through the recess 452.

The recesses 452 provide additional flexibility in the placement of the manifold 72 because the manifold 72 may be placed at a variety of vertical positions, so that the associated conduits extend through any of the recesses 222 of the first side wall unit 185, the enlarged recesses 223 of the first side wall unit 185, and the recesses 452 of the second side wall unit 383. The recesses 452 of the second side wall unit 383 may also cooperate with the recesses 222 and/or the enlarged recesses 223 of the first side wall unit 185 to facilitate connection of larger conduits to a manifold.

Each of the lateral side walls has a retention slot 464 disposed above the retention shelf 448. The retention slots 464 may be used to retain the lid 284. Alternatively, the retention slots 464 may be used to retain the third side wall unit 389, which is an optional extension for the second side wall unit 383.

The third side wall unit 389 has a third substantially vertical wall 470 with a pair of longitudinal side walls 471 and a pair of lateral side walls 472. The third substantially vertical wall 470 has a first edge 474 that is upwardly disposed in the orientation shown in FIG. 5, and a second edge 476 that is downwardly disposed. The third side wall unit 389 also has a retention shelf 478 that is sized to support the lid 284 like the retention shelf 448 of the second side wall unit 383. Additionally, the third side wall unit 389 has retention slots 464, like those of the second side wall unit 383, disposed above the retention shelf 478. The retention slots 464 of the third side wall unit 389 may also be used to retain the lid 284.

The third side wall unit 389 has two retention members 480 that extend toward the second side wall unit 383. Each of the retention members 480 may include a retention feature 482 that extends outward to engage the corresponding retention slot 464 of the second side wall unit 383. The retention members 480 are flexible, and therefore can be deflected into and out of engagement with the retention slots 464. The retention features 482 may be shaped to cause the retention members 480 to flex to permit engagement with the retention slots 464, but to remain engaged until the retention members 480 are manually flexed out of engagement with the retention slots 464. Accordingly, the third side wall unit 389 may simply be placed on top of the second side wall unit 383 and pressed into place to cause the retention members 480 to interlock with the retention features 482.

The retention slots 464 of the third side wall unit 389 may be used to retain the lid 284. Alternatively, the retention slots 464 may be used to retain another side wall unit (not shown) identical to the third side wall unit 389 (e.g., a fourth side wall unit). Multiple additional side wall units may be stacked on top of the third side wall unit 389 to raise the height of the lid 284 to the desired level, thereby adapting the height of the corresponding valve containment assembly to the height of the hole in which it is disposed.

Such a valve containment assembly may be disposed in a relatively shallow hole by seating the lid 284 directly on the second side wall unit 383. Such a valve containment assembly may alternatively be disposed in a relatively deep hole by stacking a plurality of additional side wall units on top of the third side wall unit 389, and then seating the lid 284 directly on the uppermost of the side wall units. Thus, the third side wall unit 389 acts as a "stackable extension."

Like the components described previously, the second and third side wall units 383, 389 may be manufactured via injection molding or the like. The resulting valve containment assembly may be installed by, first, disposing the first side wall unit 185 in the hole 100. The manifold 72 (or a differently configured manifold) may then be placed on the grate 218 of the first side wall unit 185 and aligned with the desired recesses 222, enlarged recesses 223, and/or future positions of the recesses 452. The aligned recesses 222, enlarged recesses 223, and/or recesses 452 may be opened by removing the corresponding tabs 230, 236, and/or 460.

The main line 24 and distribution conduits 36, 38, 40 may then be connected to the manifold 72, and the second side wall unit 383 may be disposed to rest on the first edge 224 of the first side wall unit 185. The lid 284, or alternatively, the third side wall unit 389, and any number of additional identical side wall units, may then be disposed on the first edge 450 of the second side wall unit 383, and latched into place. The remainder of the hole 100 may then be filled to complete the installation.

Figure 6:
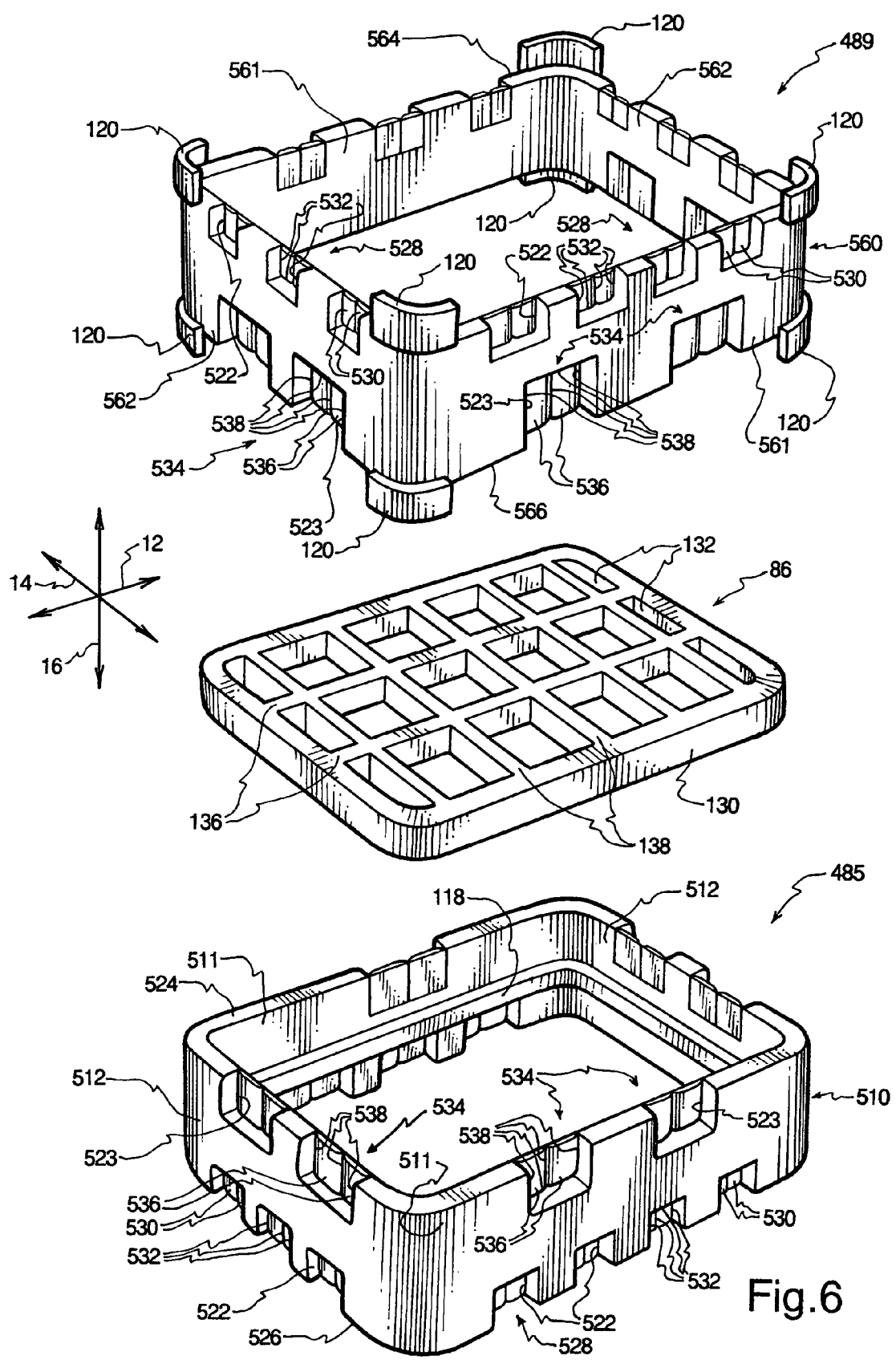
FIG. 6 is an exploded, perspective view of first and third side wall units and a grate that may be used in conjunction with the manifold box of FIG. 2 to provide another alternative embodiment of a valve containment assembly according to the invention.

Referring to FIG. 6, a perspective view illustrates a first side wall unit 485 and a third side wall unit 489 that may be used in conjunction with the manifold box 82 and the grate 86 of FIGS. 1 and 2 to form a valve containment assembly according to another alternative embodiment of the invention. The first side wall unit 485 may be used as a base, and may thus rest on the floor 102 of the hole 100. The third side wall unit 489 may rest on top of the first side wall unit 485, and the manifold box 82 may be disposed on top of the third side wall unit 489.

The first side wall unit 485 has a first substantially vertical wall 510 with a generally rectangular shape. The first substantially vertical wall 510 includes a pair of longitudinal side walls 511 and a pair of lateral side walls 512. A retention shelf 118 extends generally inward from the first substantially vertical wall 510. The retention shelf 118 is shaped to support the grate 86 in such a manner that the grate 86 can rest on the retention shelf 118, within the first substantially vertical wall 510.

The first substantially vertical wall 510 has a plurality of recesses 522 distributed about one end of the first substantially vertical wall 510, and a plurality of enlarged recesses 523 (e.g., a second plurality) distributed about the opposite end. The enlarged recesses 523 are contiguous with a first edge 524 of the first substantially vertical wall 510, and the recesses 522 are contiguous with a second edge 526 of the first substantially vertical wall 510. The recesses 522 may each be sized to accommodate about half of the cross section of a relatively small conduit, such as a one inch or a one-and-a-half inch conduit. The enlarged recesses 523 may each be sized to accommodate about half of the cross section of a larger conduit such as a two inch conduit.

A recess may be said to "receive" a conduit, even if less than the entire cross section of the conduit can fit within the recess. Thus, the recesses 522 and the enlarged recesses 523 are designed to receive conduits, even though two contiguous recesses 522 or two contiguous enlarged recesses 523 may be required to fully encircle the perimeter of a single conduit. A recess that is blocked, for example, by a frangible portion, may even be said to be capable of receiving a conduit because the conduit need not pass fully through the recess to be received by it.

The first substantially vertical wall 510 has a plurality of frangible portions 528 arranged to block the recesses 522. Each of the frangible portions 528 has a pair of tabs 530 connected to each other and to the remainder of the first substantially vertical wall 510 by regions of reduced wall thickness 532 that can be torn to permit removal of the tabs 530. Similarly, the first substantially vertical wall 510 has a plurality of enlarged frangible portions 534 arranged to block the enlarged recesses 523. Each of the enlarged frangible portions 534 includes a pair of tabs 536 connected to each other and to the remainder of the first substantially vertical wall 510 by regions of reduced wall thickness 538 that can be torn to permit removal of the tabs 536.

The third side wall unit 489 has a third substantially vertical wall 560 that includes a pair of longitudinal side walls 561 and a pair of lateral side walls 562. The third substantially vertical wall 560 has a first edge 564, which is upwardly disposed in the orientation of FIG. 6, and a second edge 566, which is downwardly disposed. The third substantially vertical wall has a plurality of recesses 522 and a plurality of enlarged recesses 523 (e.g., a second plurality) like those of the first side wall unit 485. The recesses 522 and the enlarged recesses 523 are covered by frangible portions 528, 534, respectively, like those of the first side wall unit 485.

The third side wall unit 489 also has a plurality of alignment cleats 120, like those of previous embodiments, disposed proximate the first and second edges 564, 566. The alignment cleats 120 facilitate positioning of the second side wall unit 83 on top of the first edge 564 or the second edge 566 of the third side wall unit 489.

The first and third side wall units 485, 489 may be coupled together in multiple relative orientations to facilitate containment of different manifolds. More precisely, for manifolds attached to a relatively small number of large conduits, the first and third side wall units 485, 489 may be oriented as shown in FIG. 6. The grate 86 is disposed to rest on the retention shelf 118, and the second edge 566 of the third side wall unit 489 rests on the first edge 524 of the first side wall unit 485.

The enlarged recesses 523 of the third side wall unit 489 are then aligned with the enlarged recesses 523 of the first side wall unit 485. As a result, when the enlarged frangible portions 534 are removed from a pair of contiguous enlarged recesses 523, a large conduit, such as a two inch conduit, may pass through the two recesses. The enlarged recesses 523 may each be too small in the transverse direction 16 to permit passage of such a conduit without being disposed adjacent to an open area, such as another enlarged recess 523.

In such a configuration, the first and third side wall units 485, 489 may easily contain a manifold with one or two valves attached to enlarged conduits. One pair of coplanar longitudinal side walls 511, 561 has only one set of aligned enlarged recesses 523, while the other pair of coplanar longitudinal side walls 511, 561 has two sets of aligned enlarged recesses 523. If desired, for a single valve manifold, the main line (not shown) may enter via one set of aligned enlarged recesses 523 of the lateral side walls 512, 562, and the conduit may exit via the set of enlarged recess 523 of the pair of coplanar longitudinal side walls 511, 561 having only one set of aligned enlarged recesses 523. This permits the conduit to exit the first and third side wall units 485, 489 at a central location.

Alternatively, a single conduit may exit the first and third side wall units 485, 489 via the pair of coplanar longitudinal side walls 511, 561 having two sets of aligned enlarged recesses 523. The extra set of aligned enlarged recesses 523 of that pair of coplanar longitudinal side walls 511, 561 may simply remain blocked by the corresponding enlarged frangible portions 534. If the manifold has two valves, two enlarged conduits may exit the first and third side wall units 485, 489 through the two sets of aligned enlarged recesses 523 of the pair of coplanar longitudinal side walls 511, 561 described just previously.

The first and third side wall units 485, 489 may also be used to contain a manifold having from one to four valves to which from one to four relatively smaller conduits, such as one inch or one-and-a-half inch conduits, are attached. The first side wall unit 485 may be turned upside-down from the orientation shown in FIG. 6, so that the first edge 524 is disposed to rest on the floor 102 of the hole 100. The second edge 526, and the contiguous recesses 522, are then oriented upward. The third side wall unit 489 is also turned upside-down from the orientation shown in FIG. 6, so that the first edge 564 rests on the second edge 526 of the first side wall unit 485. The recesses 522 of the third side wall unit 489 are then contiguous with the recesses 522 of the first side wall unit 485.

The retention shelf 118 is disposed substantially halfway between the first and second edges 524, 526 of the first side wall unit 485. The retention shelf 118 is shaped such that the grate 86 can rest either on the upwardly oriented side in the view of FIG. 6, or on the opposing side, which will be oriented upward when the first side wall unit 485 is reoriented. The grate 86 may thus be placed near the enlarged recesses 523, or near the recesses 522. Accordingly, a manifold may be disposed to rest on the grate in either configuration.

As shown, one pair of coplanar longitudinal side walls 511, 561 has three recesses 522, and the other has four recesses 522. The conduits connected to a three or four valve manifold may be routed through the aligned sets of recesses 522 of the corresponding pair of coplanar longitudinal side walls 511, 561. Relatively narrow conduits connected to manifolds with fewer than three valves may pass through any coplanar pair of the longitudinal side walls 511, 561 or any coplanar pair of the lateral side walls 512, 562 because each of the longitudinal side walls 511, 561 and the lateral side walls 512, 562 has at least two recesses 522. Of course, aligned pairs of recesses 522 that do not receive a conduit remain blocked by the corresponding frangible portions 528.

Like components described previously, the first and third side wall units 485, 489 may be manufactured by injection molding or the like. The resulting valve containment assembly may be installed by, first inserting the first side wall unit 485 into the hole 100, with the desired edge of the first and second edges 524, 526 facing upward. The grate 86 is placed within the first substantially vertical wall 510 such that the grate 86 rests on the retention shelf 118. The manifold 72 (or a differently configured manifold) is then placed on the grate 86 and aligned with the desired recesses 522 or enlarged recesses 523 of the first side wall unit 485 and the future positions of the recesses 522 or enlarged recesses 523 of the third side wall unit 489.

The main line 24 and the distribution conduits 36, 38, 40 are then coupled to the manifold 72, and the third side wall unit 489 is placed to rest on the upwardly disposed edge of the first and second edges 524, 526 of the first side wall unit 485. The third side wall unit 489 is oriented such that the recesses 522 of the first and third side wall units 485, 489 are contiguous with each other, or the enlarged recesses 523 of the fist and third side wall units 485, 489 are contiguous with each other. The valve box 82 is then placed to rest on the upwardly disposed edge of the first and second edges 564, 566 of the third side wall unit 489. The remainder of the hole 100 is then filled in to complete the installation.

Figure 7:
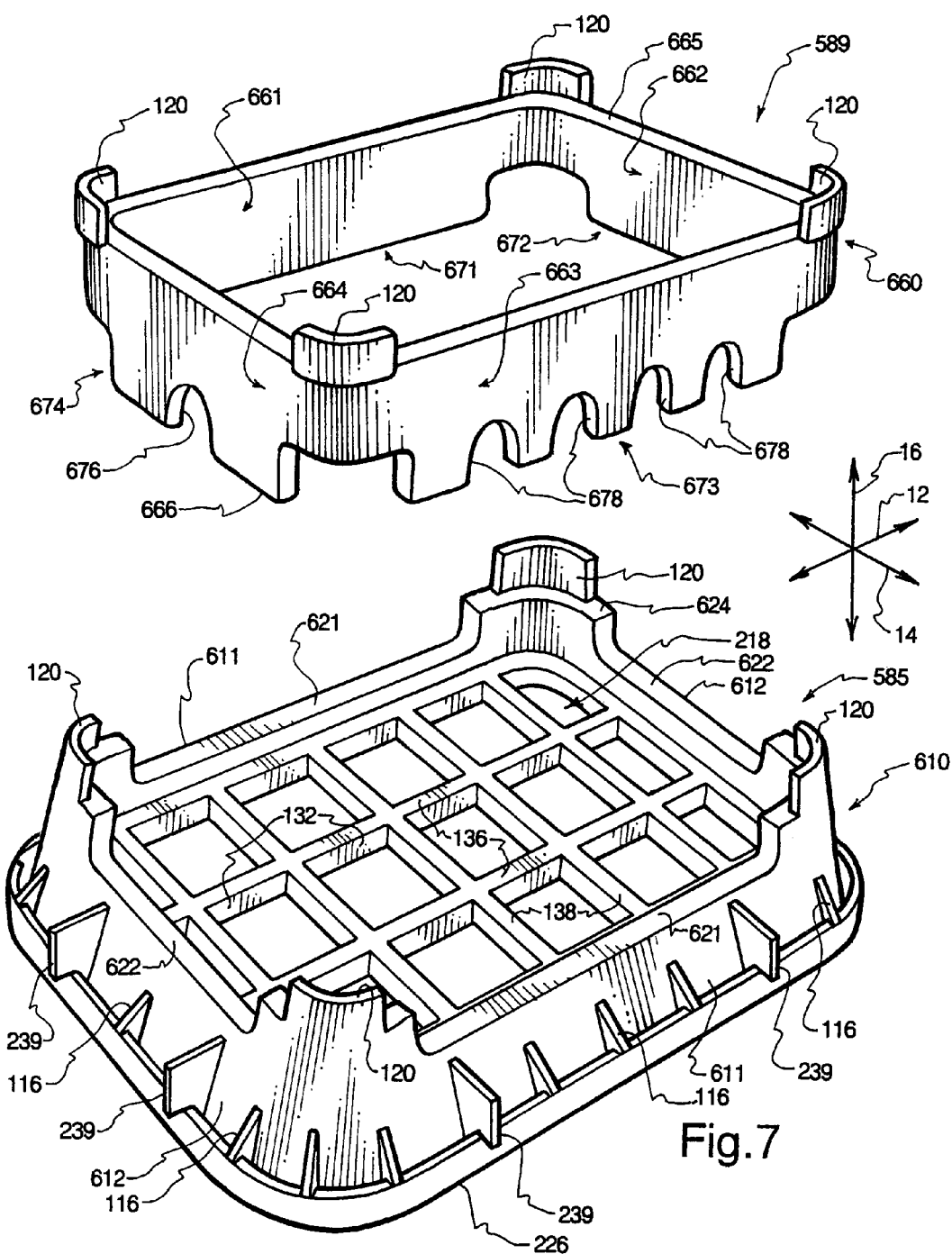
FIG. 7 is an exploded, perspective view of first and third side wall units that may be used in conjunction with the manifold box of FIG. 2 to provide another alternative embodiment of a valve containment assembly according to the invention.

Referring to FIG. 7, a perspective view illustrates a first side wall unit 585 and a third side wall unit 589 that may be used in conjunction with the manifold box 82 of FIGS. 1 and 2 to form a valve containment assembly according to another alternative embodiment of the invention. As shown, the first side wall unit 585 is similar to the first side wall unit 185 of FIG. 3. The first side wall unit 585 has a first substantially vertical wall 610 with a generally rectangular shape. The first substantially vertical wall 610 has a pair of longitudinal side walls 611 and a pair of lateral side walls 612.

The first side wall unit 585 differs from the first side wall unit 185 of FIG. 3 in that, in place of a plurality of relatively small recesses, each of the longitudinal side walls 611 has a broad recess 621 extending along most of the length of the longitudinal side wall 611. Similarly, each of the lateral side walls 612 has a broad recess 622 that extends along most of the length of the lateral side wall 612. The first substantially vertical wall 610 has a first edge 624 that is upwardly disposed. A plurality of alignment cleats 120 like those of the first side wall unit 185 extend above the first edge 624. The first substantially vertical wall 610 also has a second edge 226, which may be the same as the second edge 226 of the first side wall unit 185. The first side wall unit 585 also has a grate 218, gussets 116, and supports 239 like those of the first side wall unit 185.

The third side wall unit 589 has a third substantially vertical wall 660 with a generally rectangular shape. The third substantially vertical wall 660 has a first longitudinal side wall 661, a first lateral side wall 662, a second longitudinal side wall 663, and a second lateral side wall 664. The third substantially vertical wall 660 has a first edge 665 and a second edge 666, with a plurality of alignment cleats 120 extending upward from the first edge 665.

The first longitudinal side wall 661 has a first longitudinal skirt 671 that extends toward the first side wall unit 585. Similarly, the first lateral side wall 662 has a first lateral skirt 672, the second longitudinal side wall 663 has a second longitudinal skirt 673, and the second lateral side wall 664 has a second lateral skirt 674. The skirts 671, 672, 673, 674 are collectively shaped to receive conduits to be connected to a manifold resting on the grate 218 of the first side wall unit 585. More precisely, the second lateral skirt 574 has recess 676 positioned to receive a supply conduit such as the main line 24 shown in FIG. 1. The second longitudinal skirt 673 has a plurality of recesses 678 positioned to receive distribution conduits connected to the valves of a manifold, like the distribution conduits 36, 38, 40 of FIG. 1.

As shown, the second longitudinal skirt 673 has four recesses 678 to accommodate conduits connected to a manifold (not shown) with four valves. However, for manifolds having less valves, one or more of the recesses 678 may be left open, or may be blocked through the use of attachable plates, or via frangible portions like the frangible portions 228 of the first side wall unit 185 of FIG. 3. Alternatively, a different third side wall unit (not shown) may be used, and may be identical to the third side wall unit 589 except that there may be less recesses present in the corresponding second longitudinal skirt 673. Different side wall units (not shown) may also have more recesses, differently sized and/or positioned recesses, or a variety of other differences from the third side wall unit 589 of FIG. 7, to accommodate different manifold types.

Like components described previously, the first and third side wall units 585, 589 may be manufactured by injection molding or other methods. The resulting valve containment assembly may be assembled by, first inserting the first side wall unit 585 into the hole 10. The manifold 72 (or a differently configured manifold) may then be placed to rest on the grate 218, and may be aligned with the future positions of the recesses 676, 678 of the third side wall unit 589.

The associated conduits may then be connected to the manifold 72, and the third side wall unit 589 may be inserted to rest on the first edge 624 of the first side wall unit 585. The skirts 671, 672, 673, 674 slide into the corresponding broad recesses 621, 622 in such a manner that the various conduits connected to the manifold 72 are disposed in the recesses 676, 678. If any of the recesses 676, 678 are left open, they may be blocked to prevent unnecessary entry of dirt. The manifold box 82 may then be placed on the first edge 665 of the third side wall unit 589, and the remainder of the hole 100 may be filled in to complete the installation.

Figure 8:
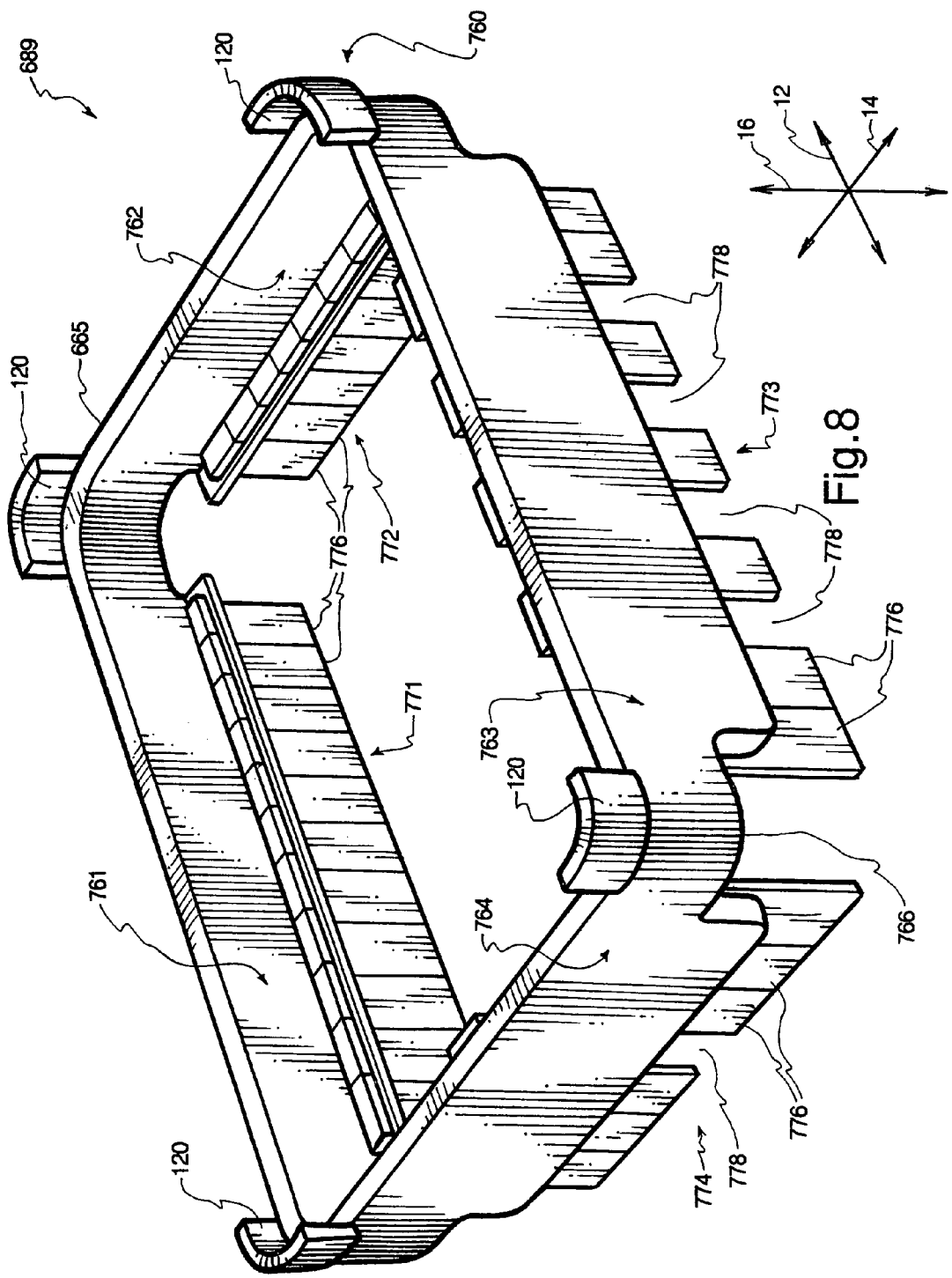
FIG. 8 is a perspective view of a third side wall unit that may be used in conjunction with the first side wall unit of FIG. 7 and the manifold box of FIG. 2 to provide another alternative embodiment of a valve containment assembly according to the invention.

Referring to FIG. 8, a perspective view illustrates a third side wall unit 689 that may be used in conjunction with the first side wall unit 585 of FIG. 7 and the manifold box 82 of FIGS. 1 and 2 to provide a valve containment assembly according to another alternative embodiment of the invention. The third side wall unit 689 provides an alternative to the third side wall unit 589 of FIG. 7.

The third side wall unit 689 has a third substantially vertical wall 760 with a generally rectangular shape. The third substantially vertical wall 760 has a first longitudinal side wall 761, a first lateral side wall 762, a second longitudinal side wall 763, and a second lateral side wall 764. The third substantially vertical wall 760 also has a first edge 665 like that of the third side wall unit 589 and a second edge 766 facing generally toward the first side wall unit 585.

The first longitudinal side wall 761 has a first longitudinal skirt 771 that extends toward the first side wall unit 685. Similarly, the first lateral side wall 762 has a first lateral skirt 772, the second longitudinal side wall 763 has a second longitudinal skirt 773, and the second lateral side wall 764 has a second lateral skirt 774. Each of the skirts 771, 772, 773, 774 includes an array of slidable cover plates 776, each of which is independently slidable in the transverse direction 16 between an extended position and a retracted position. In their retracted positions, the slidable cover plates 776 provide space through which conduits may pass through the skirts 771, 772, 773, 774.

As shown in FIG. 8, one of the slidable cover plates 776 of the second lateral skirt 774 and four of the slidable cover plates 776 of the second longitudinal skirt 773 are in the retracted position to leave gaps 778 that accommodate conduits in a manner similar to that of the recesses 676, 678 of the previous embodiment. However, the third side wall unit 689 of FIG. 8 provides a more flexible design because a wide variety of manifold types can be accommodated by simply rearranging the slidable cover plates 776. The slidable cover plates 776 may be biased into the extended position by the force of gravity.

Like other components described previously, the third side wall unit 689 may be manufactured via injection molding or the like. The slidable cover plates 776 may optionally be formed separately from the remainder of the third side wall unit 689 and assembled to form the structure illustrated in FIG. 8. The resulting valve containment assembly may be installed in a manner similar to that of the previous embodiment. More precisely, the first side wall unit 585 is first inserted into the hole 100, and the manifold 72 (or a differently configured manifold) is placed to rest on the grate 218. The associated conduits, such as the main line 24 and distribution conduits 36, 38, 40 of FIG. 1, are connected to the manifold 72.

The third side wall unit 689 is placed to rest on the first edge 624 of the first side wall unit 585. As the third side wall unit 689 is put in place, the slidable cover plates 776 that abut the conduits are automatically moved into the retracted position to avoid interfering with passage of the conduits. The manifold box 82 may then be placed to rest on the first edge 665 of the third side wall unit 689, and the remainder of the hole 100 may be filled in to complete the installation.

Figure 9:
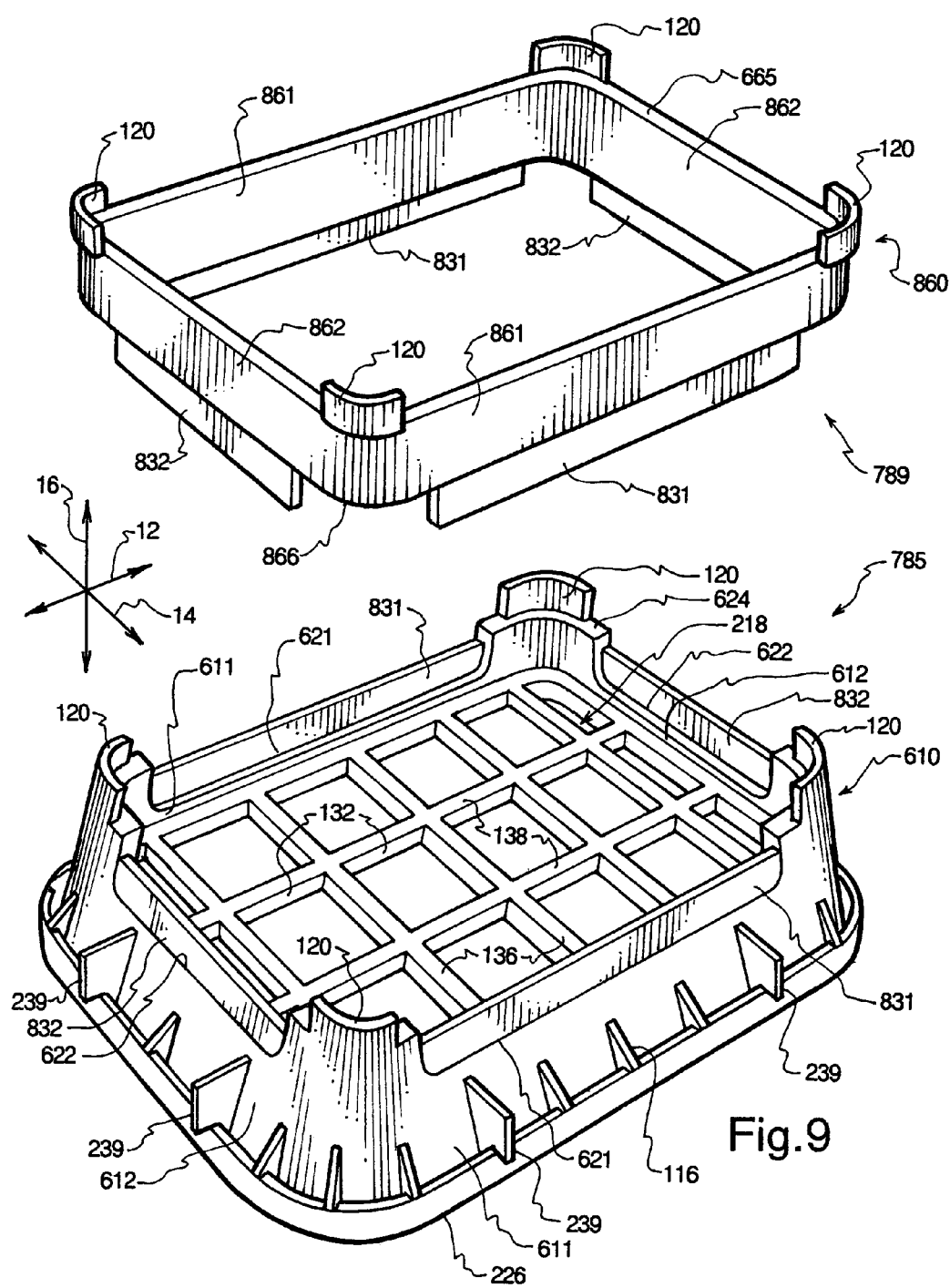
FIG. 9 is an exploded, perspective view of first and third side wall units that may be used in conjunction with the manifold box of FIG. 2 to provide yet another alternative embodiment of a valve containment assembly according to the invention.

Referring to FIG. 9, a perspective view illustrates a first side wall unit 785 and a third side wall unit 789 that may be used in conjunction with the manifold box 82 of FIGS. 1 and 2 to form a valve containment assembly according to another embodiment of the invention. As shown, the first side wall unit 785 is similar to the first side wall unit 585 of FIG. 7. The first side wall unit 785 has a first substantially vertical wall 610 with longitudinal side walls 611 and lateral side walls 612 like those of the first side wall unit 585. The first substantially vertical wall 610 has a first edge 624 and a second edge 626, with broad recesses 621, 622 formed in the longitudinal and lateral side walls 611, 612, respectively. The first side wall unit 785 also has a grate 218, alignment cleats 120, gussets 116, and supports 239.

In addition to the features of the first side wall unit 585 of FIG. 7, the first side wall unit 785 a pair of longitudinal flexible barriers 831 disposed in the broad recesses 621 of the longitudinal side walls 611 and a pair of lateral flexible barriers 832 disposed in the broad recesses 622 of the lateral side walls 612. The flexible barriers 831, 832 may be formed of a sponge-like foam material that serves as a barrier for soil. Alternatively, the flexible barriers 831, 832 may be formed of an elastomer such as a pliable rubber.

The third side wall unit 789 has a third substantially vertical wall 860 with a generally rectangular shape. The third substantially vertical wall 860 has a pair of longitudinal side walls 861 and a pair of lateral side walls 862. The third substantially vertical wall 860 has a first edge 665 like that of the third side wall units 589, 689 of FIGS. 7 and 8. Additionally, the third substantially vertical wall has a second edge 866 designed to rest on the first edge 624 of the first side wall unit 785. The longitudinal and lateral side walls 861, 862 have longitudinal and lateral flexible barriers 831, 832, respectively, which may be like those of the first side wall unit 785.

The first and third substantially vertical walls 785, 789 may be formed by injection molding or the like. The flexible barriers 831, 832 may be formed separately from the remainders of the first and third substantially vertical walls 785, 789 by molding, extrusion, or the like. The flexible barriers 831, 832 may then be attached in place via adhesives or other known attachment devices.

The resulting valve containment assembly may be installed by, first inserting the first side wall unit 785 into the hole 100, and then placing the manifold 72 (or a differently configured manifold) on the grate 218. Various conduits, such as the main line 24 and distribution conduits 36, 38, 40, may then be coupled to the manifold 72 such that the conduits rest on some or all of the flexible barriers 831, 832, thereby deforming the flexible barriers 831, 832 somewhat.

The third side wall unit 789 is then placed on the first edge 624 of the first side wall unit 785. The flexible barriers 831, 832 of the third side wall unit 789 press against the conduits and are deformed thereby. The portions of the flexible barriers 831, 832 of the first and third side wall units 785, 789 that are not deformed by contact with conduits may abut each other to generally form a seal that keeps soil from entering the valve containment assembly through any space between the first and third side wall units 785, 789. The manifold box 82 may then be seated on the first edge 665 of the third side wall unit 789, and the remainder of the hole 100 may be filled in to complete the installation.

Elements of the various embodiments described above may be combined and/or supplemented with elements known in the art to form a wide variety of additional embodiments. Features disclosed above, such as recesses, frangible portions, extensions, spanning members, and the like may be combined in many ways to form valve containment assemblies adapted to use with many different manifolds, hole configurations, conduit types, and the like.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed is:

1. A valve containment assembly for containing at least one valve to which a plurality of irrigation conduits are coupled, the valve containment assembly comprising:

a first side wall unit comprising a first substantially vertical wall having a first edge in which a recess is formed, wherein the recess is spaced from a base plane on which the valve containment assembly rests and is sized to receive at least one of the irrigation conduits; and a lid positionable to substantially block access to the valve from outside the valve containment assembly, wherein the first substantially vertical wall encircles an interior space containing the valve wherein the first side wall unit further comprises a spanning member coupled to the first substantially vertical wall to span the interior space to maintain spacing of the valve and the irrigation conduits above the base plane.

2. The valve containment assembly of claim 1, wherein the valve is one of a plurality of valves coupled together to form a first manifold, each of the valves having a first size, wherein the recess is one of a first plurality of recesses formed in the first edge, wherein each of the recesses is spaced from the base plane.

3. The valve containment assembly of claim 2, wherein the first plurality of recesses comprises a first set of recesses spaced apart and sized to receive the irrigation conduits, and a second set of recesses spaced apart and sized to receive irrigation conduits coupled to a second manifold comprising a plurality of valves sized differently from the valves of the first manifold.

4. The valve containment assembly of claim 2, wherein the first substantially vertical wall further comprises a second edge disposed on an opposite side of the first substantially vertical wall from the first edge, wherein a second plurality of recesses is formed in the second edge and comprises a first set of recesses spaced apart and sized to receive irrigation conduits coupled to a second manifold comprising a plurality of valves sized differently from the valves of the first manifold.

5. The valve containment assembly of claim 1, further comprising a second side wall unit comprising a second substantially vertical wall having a second edge, wherein the first and second side wall units are stackable such that the first edge of the first substantially vertical wall and the second edge of the second substantially vertical wall abut each other so that the second edge of the second substantially vertical wall forms a boundary of the recess.

6. The valve containment assembly of claim 1, wherein the first substantially vertical wall comprises a frangible portion contiguous with the first edge of the first substantially vertical wall and aligned with the recess, wherein the frangible portion is removable to provide an opening through which at least a portion of one of the irrigation conduits is positionable to reach the valve.

7. The valve containment assembly of claim 1, wherein the first side wall unit and the lid are each generally rectangular in shape as viewed from along a transverse direction generally perpendicular to the lid.

8. The valve containment assembly of claim 1, further comprising a second side wall unit comprising a second substantially vertical wall having a second edge, wherein the first and second side wall units are stackable such that the second edge of the second side wall unit rests on supports extending outward from the first side wall unit.

9. The valve containment assembly of claim 8, wherein the second substantially vertical wall comprises a first edge against which the lid is seated, and an opening aligned with the recess to permit passage of the one of the plurality of irrigation conduits through the second substantially vertical wall when the first and second side wall units are stacked.

10. A valve containment assembly for containing at least one valve to which a plurality of irrigation conduits are coupled, the valve containment assembly comprising:

a first side wall unit comprising a first substantially vertical wall having a first edge in which a recess is formed, wherein the recess is sized to receive at least one of the irrigation conduits; and a second side wall unit comprising a second substantially vertical wall having a second edge, wherein the first and second side wall units are stackable such that the first and second edges abut each other so that the second edge forms a boundary of the recess, wherein the first substantially vertical wall encircles an interior space containing the valve, wherein the first side wall unit further comprises a spanning member coupled to the first substantially vertical wall to span the interior space to maintain spacing of the valve and the irrigation conduits above a base plane on which the valve containment assembly rests.

11. The valve containment assembly of claim 10, wherein the second side wall unit rests on the first side wall unit, the second substantially vertical wall comprising a first edge, the valve containment assembly further comprising a lid positionable to seat against the first edge of the second substantially vertical wall to substantially block access to the valve from outside the valve containment assembly.

12. The valve containment assembly of claim 10, wherein the first side wall unit rests on the second side wall unit, the first substantially vertical wall comprising a second edge, the valve containment assembly further comprising a lid positionable to seat against the second edge of the first substantially vertical wall to substantially block access to the valve from outside the valve containment assembly.

13. The valve containment assembly of claim 10, wherein the second substantially vertical wall comprises a recess that aligns with the recess of the first substantially vertical wall when the first and second side wall units are stacked such that the recesses cooperate to receive an entire diameter of at least one of the irrigation conduits.

14. The valve containment assembly of claim 10, further comprising a third side wall unit disposed generally above the first and second side wall units, the valve containment assembly further comprising a lid positionable to seat against an upwardly disposed edge of the third side wall unit to substantially block access to the valve from outside the valve containment assembly.

15. The valve containment assembly of claim 10, wherein the first substantially vertical wall comprises a frangible portion contiguous with the first edge and aligned with the recess, wherein the frangible portion is removable to provide an opening through which at least a portion of one of the irrigation conduits is positionable to reach the valve.

16. A valve containment assembly for containing at least one valve to which a plurality of irrigation conduits are coupled, the valve containment assembly comprising:

a first side wall unit comprising a first substantially vertical wall having a first edge, the first substantially vertical wall comprising a frangible portion contiguous with the first edge, wherein the frangible portion is removable to provide an opening through which one of the irrigation conduits is positionable to reach the valve; and a lid positionable to substantially block access to the valve from outside the valve containment assembly, wherein the first substantially vertical wall encircles an interior space containing the valve, wherein the first side wall unit further comprises a spanning member coupled to the first substantially vertical wall to span the interior space to maintain spacing of the valve and the irrigation conduits above a base plane on which the valve containment assembly rests.

17. The valve containment assembly of claim 16, wherein the frangible portion comprises a tab coupled to a remainder of the first substantially vertical wall by a region of reduced wall thickness, wherein the region of reduced wall thickness is tearable to permit removal of the tab from the first substantially vertical wall.

18. The valve containment assembly of claim 16, wherein the frangible portion has a strength selected to permit manual removal of the frangible portion.

19. A valve containment assembly for containing at least one valve to which a plurality of irrigation conduits are coupled, the valve containment assembly comprising:
 a first side wall unit comprising a first substantially vertical wall that encircles an interior space containing the valve, and a spanning member coupled to the first substantially vertical wall to span the interior space between the irrigation conduits and the base plane; and
 a lid positionable to substantially block access to the valve from outside the valve containment assembly.

20. The valve containment assembly of claim 19, wherein at least one of the group consisting of the valve and adjacent portions of the irrigation conduits rests directly on the spanning member.

21. The valve containment assembly of claim 20, wherein the spanning member comprises a grate comprising a plurality of longitudinal members that cross the interior space along a longitudinal direction and a plurality of lateral members that cross the interior space along a lateral direction substantially perpendicular to the longitudinal direction, wherein the lateral and longitudinal members cooperate to define a plurality of spaces that permit water to pass through the grate.

22. The valve containment assembly of claim 21, wherein the grate is integrally formed with the first substantially vertical wall.

23. The valve containment assembly of claim 21, wherein the grate is formed separately from the first substantially vertical wall, wherein the first substantially vertical wall comprises a retention shelf upon which the grate rests.

24. The valve containment assembly of claim 20, wherein the spanning member is displaced from the base plane to maintain a displacement of at least four inches between the valve and the base plane.

25. The valve containment assembly of claim 20, wherein the first side wall unit and the lid are each generally rectangular in shape as viewed from along a transverse direction generally perpendicular to the lid.

26. The valve containment assembly of claim 25, wherein the first substantially vertical wall is tapered such that the first side wall unit is generally trapezoidal in shape, as viewed from along a lateral direction generally parallel to the lid.

27. An irrigation assembly for distributing water to soil, the irrigation system comprising:
 a valve;
 a plurality of irrigation conduits coupled to the valve; and
 a valve containment assembly that contains the valve, the valve containment assembly comprising:
  a first side wall unit comprising a first substantially vertical wall having a first edge in which a recess is formed, wherein the recess is spaced from a base plane on which the valve containment assembly rests and is sized to receive at least one of the irrigation conduits; and
  a lid positionable to substantially block access to the valve from outside the valve containment assembly, wherein the first substantially vertical wall encircles an interior space containing the valve, wherein the first side wall unit further comprises a spanning member coupled to the first substantially vertical wall to span the interior space to maintain spacing of the valve and the irrigation conduits above the base plane.

28. The irrigation assembly of claim 27, wherein the valve containment assembly further comprises a second side wall unit comprising a second substantially vertical wall having a second edge, wherein the first and second side wall units are stackable such that the first and second edges abut each other so that the second edge forms a boundary of the recess.

29. The irrigation assembly of claim 27, wherein the first substantially vertical wall comprises a frangible portion contiguous with the first edge and aligned with the recess, wherein the frangible portion is removable to provide an opening through which at least a portion of one of the irrigation conduits is positionable to reach the valve.

30. The irrigation assembly of claim 27, wherein the valve is one of a plurality of valves coupled together to form a first manifold of the irrigation assembly.

31. The irrigation assembly of claim 30, further comprising:
 a plurality of water distribution units in fluid communication with the valve via the conduits; and
 a timer coupled to the valves to control operation of the valves.

32. An irrigation assembly for distributing water to soil, the irrigation system comprising:
 a valve;
 a plurality of irrigation conduits coupled to the valve; and
 a valve containment assembly that contains the valve, the valve containment assembly comprising:
  a first side wall unit comprising a first substantially vertical wall having a first edge in which a recess is formed, wherein the recess is sized to receive at least one of the irrigation conduits; and
  a second side wall unit comprising a second substantially vertical wall having a second edge, wherein the first and second side wall units are stackable such that the first and second edges abut each other so that the second edge forms a boundary of the recess, wherein the first substantially vertical wall encircles an interior space containing the valve, wherein the first side wall unit further comprises a spanning member coupled to the first substantially vertical wall to span the interior space to maintain spacing of the valve and the irrigation conduits above a base plane on which the valve containment assembly rests.

33. The irrigation assembly of claim 32, wherein the first substantially vertical wall comprises a frangible portion contiguous with the first edge and aligned with the recess, wherein the frangible portion is removable to provide an opening through which at least a portion of one of the irrigation conduits is positionable to reach the valve.

34. The irrigation assembly of claim 32, wherein the valve is one of a plurality of valves coupled together to form a first manifold of the irrigation assembly.

35. The irrigation assembly of claim 34, further comprising:

a plurality of water distribution units in fluid communication with the valve via the conduits; and a timer coupled to the valves to control operation of the valves.

36. An irrigation assembly for distributing water to soil, the irrigation system comprising:

a valve;

a plurality of irrigation conduits coupled to the valve; and a valve containment assembly that contains the valve, the valve containment assembly comprising a first side wall unit comprising a first substantially vertical wall having a first edge, the first substantially vertical wall comprising a frangible portion contiguous with the first edge, wherein the frangible portion is removable to provide an opening through which one of the irrigation conduits is positionable to reach the valve, wherein the first substantially vertical wall encircles an interior space containing the valve, wherein the first side wall unit further comprises a spanning member coupled to the first substantially vertical wall to span the interior space to maintain spacing of the valve and the irrigation conduits above a base plane on which the valve containment assembly rests.

37. The irrigation assembly of claim 36, wherein the valve is one of a plurality of valves coupled together to form a first manifold of the irrigation assembly.

38. The irrigation assembly of claim 37, further comprising:

a plurality of water distribution units in fluid communication with the valve via the conduits; and a timer coupled to the valves to control operation of the valves.

39. An irrigation assembly for distributing water to soil, the irrigation system comprising:

a valve;

a plurality of irrigation conduits coupled to the valve; and a valve containment assembly that contains the valve, the valve containment assembly comprising a first side wall unit comprising a first substantially vertical wall that encircles an interior space containing the valve, and a spanning member coupled to the first substantially vertical wall to span the interior space between the irrigation conduits and a base plane on which the valve containment assembly rests.

40. The irrigation assembly of claim 39, wherein at least one of the group consisting of the valve and adjacent portions of the irrigation conduits rests directly on the spanning member.

41. The irrigation assembly of claim 40, wherein the valve is one of a plurality of valves coupled together to form a first manifold of the irrigation assembly.

42. The irrigation assembly of claim 41, further comprising:

a plurality of water distribution units in fluid communication with the valve via the conduits; and a timer coupled to the valves to control operation of the valves.

43. A method for installing a valve containment assembly in a hole that extends underground to protect a valve and a plurality of irrigation conduits coupled to the valve, the hole having a floor, the method comprising:

inserting a first side wall unit into the hole, the first side wall unit comprising a first substantially vertical wall having a first edge in which a recess is formed, such that the first side wall unit is oriented to space the recess from the floor of the hole;

disposing the valve and the irrigation conduits in the hole such that one of the irrigation conduits extends through the recess; and placing a lid over the valve to substantially block access to the valve from outside the hole, wherein the first substantially vertical wall encircles an interior space containing the valve, wherein the first side wall unit further comprises a spanning member coupled to the first substantially vertical wall to span the interior space, wherein disposing the valve and the irrigation conduits in the hole comprises resting at least one of the group consisting of the valve and the irrigation conduits directly on the spanning member.

44. The method of claim 43, further comprising disposing a plurality of additional valves in the hole such that all of the valves are coupled together to form a first manifold, wherein each of the valves comprises a first size, wherein the recess is one of a first plurality of recesses formed in the first edge, wherein inserting the first side wall unit into the hole comprises spacing each of the recesses from the floor of the hole.

45. The method of claim 43, further comprising inserting a second side wall unit into the hole, the second side wall unit comprising a second substantially vertical wall having a second edge, such that the first and second side wall units are stacked such that the second edge abuts the first edge to form a boundary of the recess.

46. The method of claim 43, wherein the first substantially vertical wall comprises a frangible portion contiguous with the first edge and aligned with the recess, the method further comprising removing the frangible portion to form an opening in the first substantially vertical wall, wherein disposing the valve and the irrigation conduits in the hole comprises placing one of the irrigation conduits to extend through the recess and the opening.

47. The method of claim 43, further comprising inserting a second side wall unit into the hole, the second side wall unit comprising a second substantially vertical wall having a second edge, wherein inserting the second side wall unit into the hole comprises:

moving the second edge past the first edge; and resting the second edge on supports extending outward from the first side wall unit.

48. The method of claim 47, wherein the second substantially vertical wall comprises a first edge and an opening, wherein placing a lid over the valve comprises seating the lid against the first edge of the second substantially vertical wall, wherein inserting the second side wall unit into the hole comprises aligning the opening with the recess to permit passage of the one of the plurality of irrigation conduits through the second substantially vertical wall.

49. A method for installing a valve containment assembly in a hole that extends underground to protect a valve and a plurality of irrigation conduits coupled to the valve, the hole having a floor, the method comprising:

inserting a first side wall unit into the hole, the first side wall unit comprising a first substantially vertical wall having a first edge in which a recess is formed;

disposing the valve and the irrigation conduits in the hole such that one of the irrigation conduits extends through the recess; and inserting a second side wall unit into the hole, the second side wall unit comprising a second substantially vertical wall having a second edge, such that the first and second side wall units are stacked such that the second edge abuts the first edge to form a boundary of the recess, wherein the first substantially vertical wall encircles an interior space containing the valve, wherein the first side wall unit further comprises a spanning member coupled to the first substantially vertical wall to span the interior space, wherein disposing the valve and the irrigation conduits in the hole comprises resting at least one of the group consisting of the valve and the irrigation conduits directly on the spanning member.

50. The method of claim 49, wherein inserting the second side wall unit into the hole comprises disposing the second side wall unit to rest on the first side wall unit, wherein the second substantially vertical wall comprises a first edge, the method further comprising seating a lid against the first edge of the second substantially vertical wall to substantially block access to the valve from outside the hole.

51. The method of claim 49, wherein inserting the first side wall unit into the hole comprises disposing the first side wall unit to rest on the second side wall unit, wherein the first substantially vertical wall comprising a second edge, the method further comprising seating a lid against the second edge of the first substantially vertical wall to substantially block access to the valve from outside the hole.

52. The method of claim 49, wherein the second substantially vertical wall comprises a recess, wherein inserting the second side wall unit into the hole comprises aligning with the recess of the second substantially vertical wall with the recess of the first substantially vertical wall such that the recesses cooperate to receive an entire diameter of at least one of the irrigation conduits.

53. The method of claim 49, further comprising:
inserting a third side wall unit into the hole generally above the first and second side wall units; and
seating a lid against an upwardly disposed edge of the third side wall unit to substantially block access to the valve from outside the hole.

54. The method of claim 49, wherein the first substantially vertical wall comprises a frangible portion contiguous with the first edge and aligned with the recess, the method further comprising removing the frangible portion to form an opening in the first substantially vertical wall, wherein disposing the valve and the irrigation conduits in the hole comprises placing one of the irrigation conduits to extend through the recess and the opening.

55. A method for installing a valve containment assembly in a hole that extends underground to protect a valve and a plurality of irrigation conduits coupled to the valve, the hole having a floor, the method comprising:
inserting a first side wall unit into the hole, the first side wall unit comprising a first substantially vertical wall having a first edge, the first substantially vertical wall comprising a frangible portion contiguous with the first edge;
removing the frangible portion to form an opening in the first substantially vertical wall; and
disposing the valve and the irrigation conduits in the hole such that one of the irrigation conduits extends through the opening, wherein the first substantially vertical wall encircles an interior space containing the valve, wherein the first side wall unit further comprises a spanning member coupled to the first substantially vertical wall to span the interior space, wherein disposing the valve and the irrigation conduits in the hole comprises resting at least one of the group consisting of the valve and the irrigation conduits directly on the spanning member.

56. The method of claim 55, wherein the frangible portion comprises a tab coupled to a remainder of the first substantially vertical wall by a region of reduced wall thickness, wherein removing the frangible portion comprises tearing the region of reduced wall thickness to permit removal of the tab from the first substantially vertical wall.

57. The method of claim 55, wherein removing the frangible portion comprises:
manually grasping the frangible portion; and
manually exerting force to remove the frangible portion from the first substantially vertical wall.

58. A method for installing a valve containment assembly in a hole that extends underground to protect a valve and a plurality of irrigation conduits coupled to the valve, the hole having a floor, the method comprising:
inserting a first side wall unit into the hole, the first side wall unit comprising a first substantially vertical wall that encircles an interior space, and a spanning member coupled to the first substantially vertical wall to span the interior space; and
disposing the valve and adjacent portions of the irrigation conduits in the hole such that the valve is contained within the interior space and the spanning member is positioned between the valve and the floor of the hole.

59. The method of claim 58, wherein disposing the valve and adjacent portions of the irrigation conduits in the hole comprises positioning at least one of the group consisting of the valve and the adjacent portions of the irrigation conduits to rest directly on the spanning member.

60. The method of claim 59, wherein the grate is formed separately from the first substantially vertical wall, wherein the first substantially vertical wall comprises a retention shelf, wherein inserting the first side wall unit into the hole comprises:
inserting the first substantially vertical wall into the hole; and
inserting the grate into the interior space such that the grate rests upon the retention shelf.

61. The method of claim 59, wherein inserting the first side wall unit into the hole comprises displacing the spanning member from the floor of the hole to maintain a displacement of at least four inches between the valve and the floor.

* * * * *